US010055026B2

(12) United States Patent
Njolstad

(10) Patent No.: US 10,055,026 B2
(45) Date of Patent: Aug. 21, 2018

(54) INTERACTIVE PROJECTOR AND METHOD OF CONTROLLING INTERACTIVE PROJECTOR

(71) Applicant: Seiko Epson Corporation, Tokyo (JP)

(72) Inventor: Tormod Njolstad, Trondheim (NO)

(73) Assignee: Seiko Epson Corporation, Tokyo (JE)

(*) Notice: Subject to any disclaimer, the term of this patent is extended or adjusted under 35 U.S.C. 154(b) by 31 days.

(21) Appl. No.: 15/077,843

(22) Filed: Mar. 22, 2016

(65) Prior Publication Data

US 2016/0282959 A1    Sep. 29, 2016

(30) Foreign Application Priority Data

Mar. 27, 2015  (JP) ................................. 2015-065674

(51) Int. Cl.
*G06F 3/03* (2006.01)
*H04N 9/31* (2006.01)
*G06F 3/0354* (2013.01)

(52) U.S. Cl.
CPC .......... *G06F 3/0304* (2013.01); *G06F 3/0354* (2013.01); *H04N 9/31* (2013.01); *H04N 9/3194* (2013.01)

(58) Field of Classification Search
CPC ................. G06F 3/0304; G06F 3/0354; G06F 3/041–3/047; H04N 9/31; H04N 9/3194

USPC .......... 345/156, 173–178; 178/18.01–18.09, 178/18.11
See application file for complete search history.

(56) References Cited

U.S. PATENT DOCUMENTS

| | | | | |
|---|---|---|---|---|
| 2001/0030668 A1* | 10/2001 | Erten | .................... | G06F 3/0304 715/863 |
| 2006/0055913 A1* | 3/2006 | Toyoda | .................... | G01J 9/00 356/121 |
| 2013/0342671 A1* | 12/2013 | Hummel | .............. | G06K 9/6202 348/77 |

FOREIGN PATENT DOCUMENTS

JP    2012-150636 A    8/2012

* cited by examiner

*Primary Examiner* — Stephen G Sherman
(74) *Attorney, Agent, or Firm* — ALG Intellectual Property, LLC

(57) ABSTRACT

An interactive projector includes a projection section adapted to project a projected screen on a screen surface, an imaging section adapted to take an image of an area of the projected screen, and a pointing element detection section adapted to perform a detection process for detecting the pointing element based on the taken image, which is taken by the imaging section, and includes the pointing element, and the pointing element detection section sections the taken image into a plurality of small areas, and performs the detection process in at least one of the small areas using a parameter different from parameters in the rest of the small areas.

2 Claims, 25 Drawing Sheets

T21

T22

T23

FIG.15A  TEMPLATE IMAGE DATA
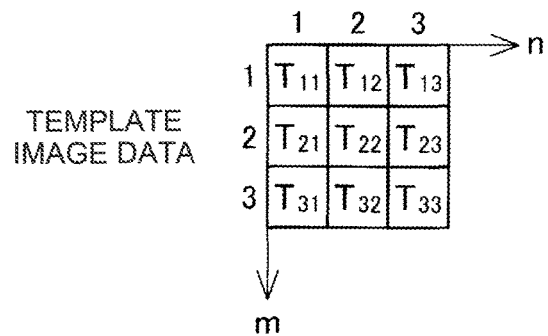
FIG.15B  TAKEN IMAGE DATA
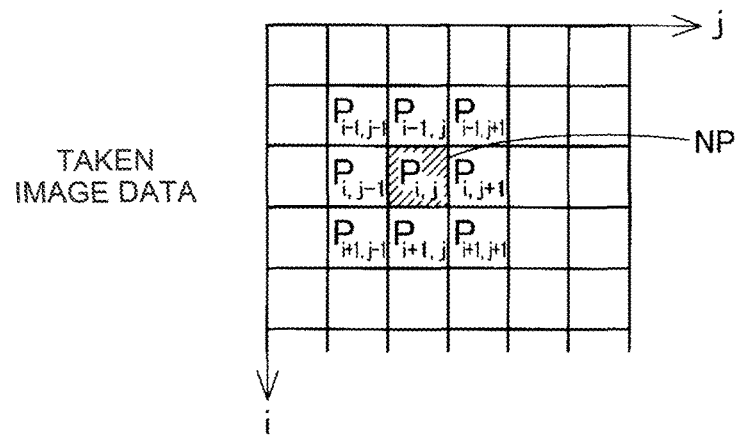
FIG.15C
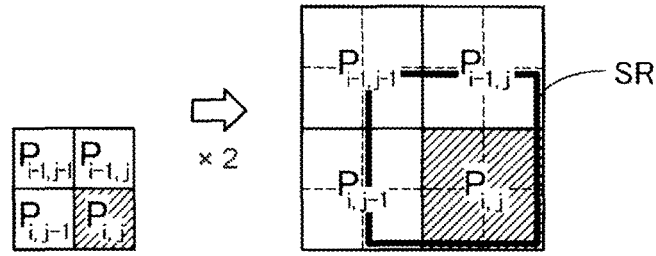
FIG.15D
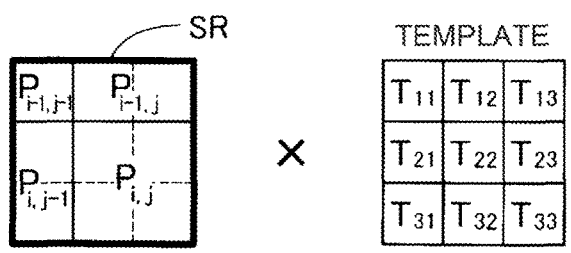

FIG.16

INTERACTIVE PROJECTOR AND METHOD OF CONTROLLING INTERACTIVE PROJECTOR

The entire disclosure of Japanese Patent Application No. 2015-065674, filed Mar. 27, 2015 is expressly incorporated by reference herein.

BACKGROUND

1. Technical Field

The present invention relates to an interactive projector and a system thereof each capable of receiving an instruction of the user to a projected screen with a pointing element.

2. Related Art

JP-A-2012-150636 (Document 1) discloses a projection display device (projector) capable of projecting a projected screen on a screen, and at the same time taking an image, which includes an object such as a finger, with a camera to detect the position of the object using the taken image. An object such as a finger is used as a pointing element for making an instruction to the projection image. In other words, in the case in which the tip of the object has contact with the screen, the projector recognizes that a predetermined instruction such as drawing is input to the projected screen, and then redraws the projected screen in accordance with the instruction. Therefore, it is possible for the user to input a variety of instructions using the projected screen as a user interface. The projector of the type capable of using the projected screen on the screen as an inputting user interface as described above is referred to as an "interactive projector." Further, the object used for making an instruction to the projected screen is referred to as a "pointing element."

In the typical interactive projector, whether or not an instruction is made using the pointing element is determined in accordance with whether or not the tip of the pointing element has contact with the screen. In Document 1, although there is described the fact that the template-matching process is performed using the pointing element (an object) as a template to thereby detect the object, a detailed study has not been made on the method of detecting the pointing element, and therefore, there has been demanded accurate detection of the pointing element.

SUMMARY

An advantage of some aspects of the invention is to solve at least a part of the problems described above, and the invention can be implemented as the following aspects or application examples.

(1) An aspect of the invention provides an interactive projector capable of receiving an instruction of a user to a projected screen with a pointing element. The interactive projector includes a projection section adapted to project the projected screen on a screen surface, an imaging section adapted to take an image of an area of the projected screen, and a pointing element detection section adapted to perform a detection process of detecting the pointing element based on a taken image, which is taken by the imaging section, and includes the pointing element, and the pointing element detection section sections the taken image into a plurality of small areas, and performs the detection process in at least one of the small areas using a parameter different from parameters in the rest of the small areas.

In some cases, the taken image includes the distortion due to the imaging direction of the imaging section and the distortion due to the imaging lens, and the size and the shape of the pointing element differ in accordance with the position (area) in the taken image. Therefore, if performing the detection process using a single parameter, an appropriate detection result cannot be obtained in some cases. According to this interactive projector, by sectioning the taken image into a plurality of small areas, and performing the detection process using the parameter suitable for each of the small areas, it is possible to improve the accuracy of the detection process to thereby improve the detection accuracy of the pointing element. It should be noted that it is also possible to use the parameter differing according to the small areas, or the parameter the same in some of the small areas.

(2) In the interactive projector described above, the interactive projector may further include a projected screen storage section storing the projected screen, and the pointing element detection section may derive a deformation ratio of the projected screen included in the taken image to the projected screen in the projected screen storage section for each of the small areas to determine the parameter for the detection process based on the deformation ratio. According to this configuration, since the detection process of the pointing element is performed using the appropriate parameter corresponding to the deformation ratio of each of the small areas sectioned by a predetermined sectioning method, the detection accuracy of the pointing element can be improved.

(3) In the interactive projector described above, the interactive projector may further include a projected screen storage section adapted to store the projected screen, and the small areas may be sectioned based on a deformation ratio of the projected screen included in the taken image to the projected screen in the projected screen storage section.

The size of the pointing element included in the taken image differs according to the deformation ratio described above. Here, the deformation ratio is a concept including magnification and a reduction ratio. According to this configuration, since the small areas are sectioned based on the deformation ratio, by performing the detection process of the pointing element using the suitable parameter corresponding to the deformation ratio, it is possible to improve the detection accuracy of the pointing element.

(4) In the interactive projector described above, the pointing element detection section may perform template matching using a template image used for detecting the pointing element as the detection process. According also to such a configuration, the pointing element can accurately be detected.

(5) In the interactive projector described above, the parameter may be the template image. For example, it is also possible to use the template images different (e.g., in direction, or in scale size) between the small areas. According to this configuration, since the template images suitable for the respective small areas can be used, the detection accuracy of the pointing element can be improved.

(6) In the interactive projector described above, the parameter different between the small areas may be the template image different in scale size. The size of the pointing element included in the taken image differs according to the position of the pointing element on the projected screen. Therefore, by using the template images having suitable scale sizes for the respective small areas, the detection accuracy of the pointing element can be improved.

(7) In the interactive projector described above, the pointing element detection section may further calculate the correlation value using a resolution-converted image corresponding to an image obtained by converting a resolution of the taken image and the template image, and then detect the pointing element based on a result of adding the correlation value using the taken image and the correlation value using the resolution-converted image to each other, and the parameter may be weighting in adding the correlation value using the taken image and the correlation value using the resolution-converted image to each other. Here, weighting does not include zero. As described above, the size of the pointing element included in the taken image is not constant, and the correlation value between the resolution-converted image and the template images with the single size differs between the small areas. Therefore, by setting weighting for addition of the small area where the high correlation value can be obtained to a high value, the accuracy of the result obtained by adding the correlation values calculated using the resolution-converted image is improved, and the detection accuracy of the pointing element can be improved.

(8) In the interactive projector described above, the pointing element detection section may generate a correlation value map representing the correlation value between the taken image and the template image, and then perform binarization based on a predetermined threshold value on the correlation value map to detect the pointing element, and the parameter may be the predetermined threshold value. The brightness of the pointing element included in the taken image differs according to the distance between the pointing element and the imaging section. Therefore, by changing the threshold value in binarization in accordance with the small areas, the detection accuracy of the pointing element can be improved.

(9) In the interactive projector described above, the pointing element detection section may generate a correlation value map representing the correlation value between the taken image and the template image, then extract a high correlation value area having the correlation value higher than a predetermined threshold value in the correlation value map, then calculate a centroid of the correlation value in the high correlation value area with accuracy corresponding to a value smaller than one pixel, and then detect the centroid as a tip position of the pointing element, and the parameter may be the number of pixels of the high correlation value area. According to this configuration, since the pointing element position can be obtained with the accuracy corresponding to a value smaller than one pixel, the detection accuracy of the pointing element can be improved. Further, as described above, since the size of the pointing element differs between the small areas, by calculating the centroid using the high correlation value areas having the sizes suitable for the respective small areas, the detection accuracy of the pointing element can be improved.

(10) In the interactive projector described above, the pointing element detection section may perform the detection process to a resolution-converted image corresponding to an image obtained by converting a resolution of the taken image to detect the pointing element, and the parameter may be a magnification in the conversion of the resolution. If increasing the resolution of the taken image, the pointing element is conceptually magnified, and if decreasing the resolution, the pointing element is conceptually shrunk. Therefore, by converting the resolution in accordance with the size of the pointing element included in each of the small areas, and then performing the detection process of the pointing element, the detection accuracy of the pointing element can be improved.

(11) In the interactive projector described above, the pointing element detection section may perform a low-pass filter process on the taken image to generate a filter-processed image, and then perform the template matching using the filter-processed image, and the parameter may be a cutoff frequency of the low-pass filter. For example, by setting the cutoff frequency of the low-pass filter to a lower frequency to increase the level of blur in the small area where the size of the pointing element is relatively small, the detection accuracy of the pointing element can be improved. In contrast, by setting the cutoff frequency of the low-pass filter to a higher frequency to decrease the level of blur in the area where the size of the pointing element is relatively large, the detection accuracy of the pointing element can be improved.

The invention can be implemented in a variety of configurations such as a system provided with a pointing element, a screen, and an interactive projector, a control method or a control device of the interactive projector, a computer program for implementing the method or the functions of the device, or a non-transitory storage medium having the computer program recorded thereon.

BRIEF DESCRIPTION OF THE DRAWINGS

The invention will be described with reference to the accompanying drawings, wherein like numbers reference like elements.

FIGS. 15A through 15D are explanatory diagrams of a calculation method of a correlation value according to the second embodiment.

FIG. 16 is an explanatory diagram of the calculation method of the correlation value according to the second embodiment.

DESCRIPTION OF EXEMPLARY EMBODIMENTS

A. General Description of System

Figure 1:
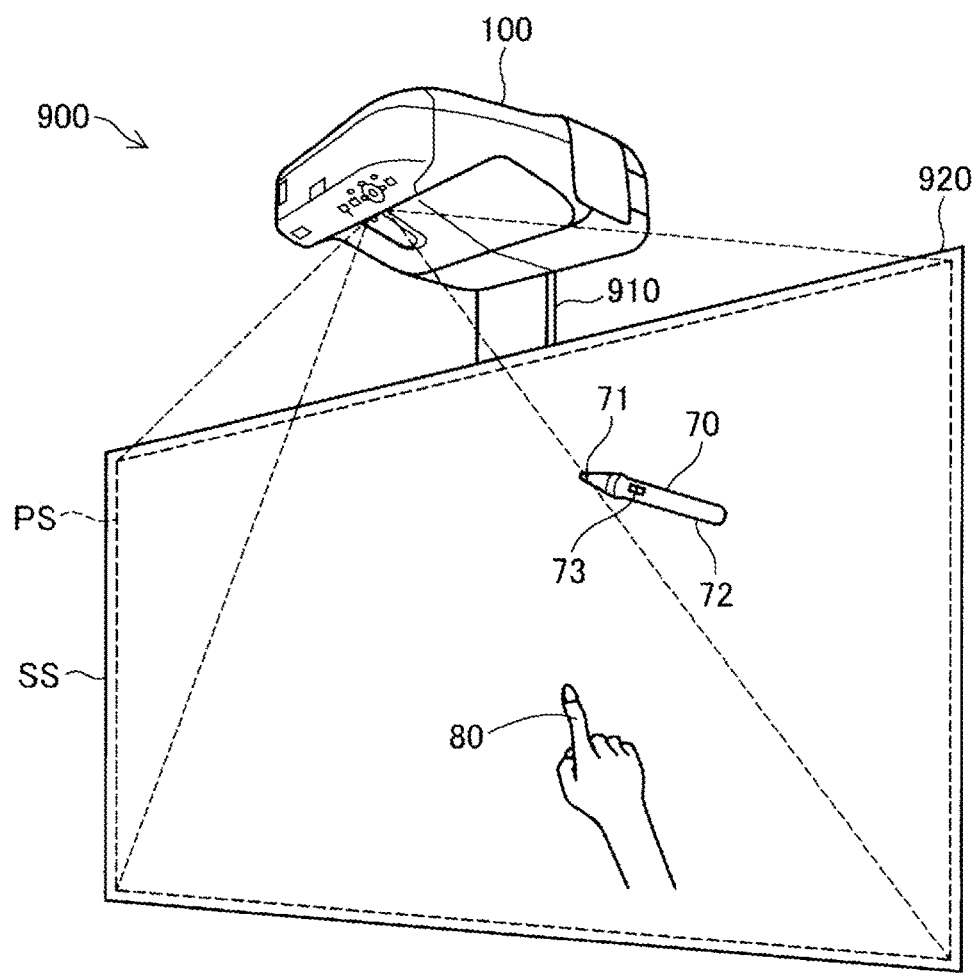
FIG. 1 is a perspective view of an interactive projection system.

FIG. 1 is a perspective view of an interactive projection system 900 according to an embodiment of the invention. The system 900 has an interactive projector 100, a screen plate 920, and a light-emitting pointing element 70. The front surface of the screen plate 920 is used as a projection screen surface SS. The projector 100 is fixed in front of and above the screen plate 920 with a support member 910. It should be noted that although the projection screen surface SS is vertically disposed in FIG. 1, it is also possible to use the system 900 with the projection screen surface SS disposed horizontally.

The projector 100 projects a projected screen PS on the projection screen surface SS. The projected screen PS normally includes an image drawn in the projector 100. In the case in which the image drawn in the projector 100 does not exist, the projector 100 irradiates the projected screen PS with light to display a white image. In the present specification, the "projection screen surface SS" (or a "screen surface SS") denotes a surface of a member on which the image is projected. Further, the "projected screen PS" denotes an area of an image projected on the projection screen surface SS by the projector 100. Normally, the projected screen PS is projected on a part of the projection screen surface SS.

The light-emitting pointing element 70 is a pen-shaped pointing element having a tip portion 71 capable of emitting light, a sleeve section 72 held by the user, and a button switch 73 provided to the sleeve section 72. The configuration and the function of the light-emitting pointing element 70 will be described later. In this system 900, one or more non-light-emitting pointing elements 80 (e.g., a non-light-emitting pen or a finger) can be used together with one or more light-emitting pointing elements 70. Hereinafter, the light-emitting pointing element 70 and the non-light-emitting pointing element 80 are also referred to simply as a pointing element 780 if not discriminated from each other.

Figure 2:
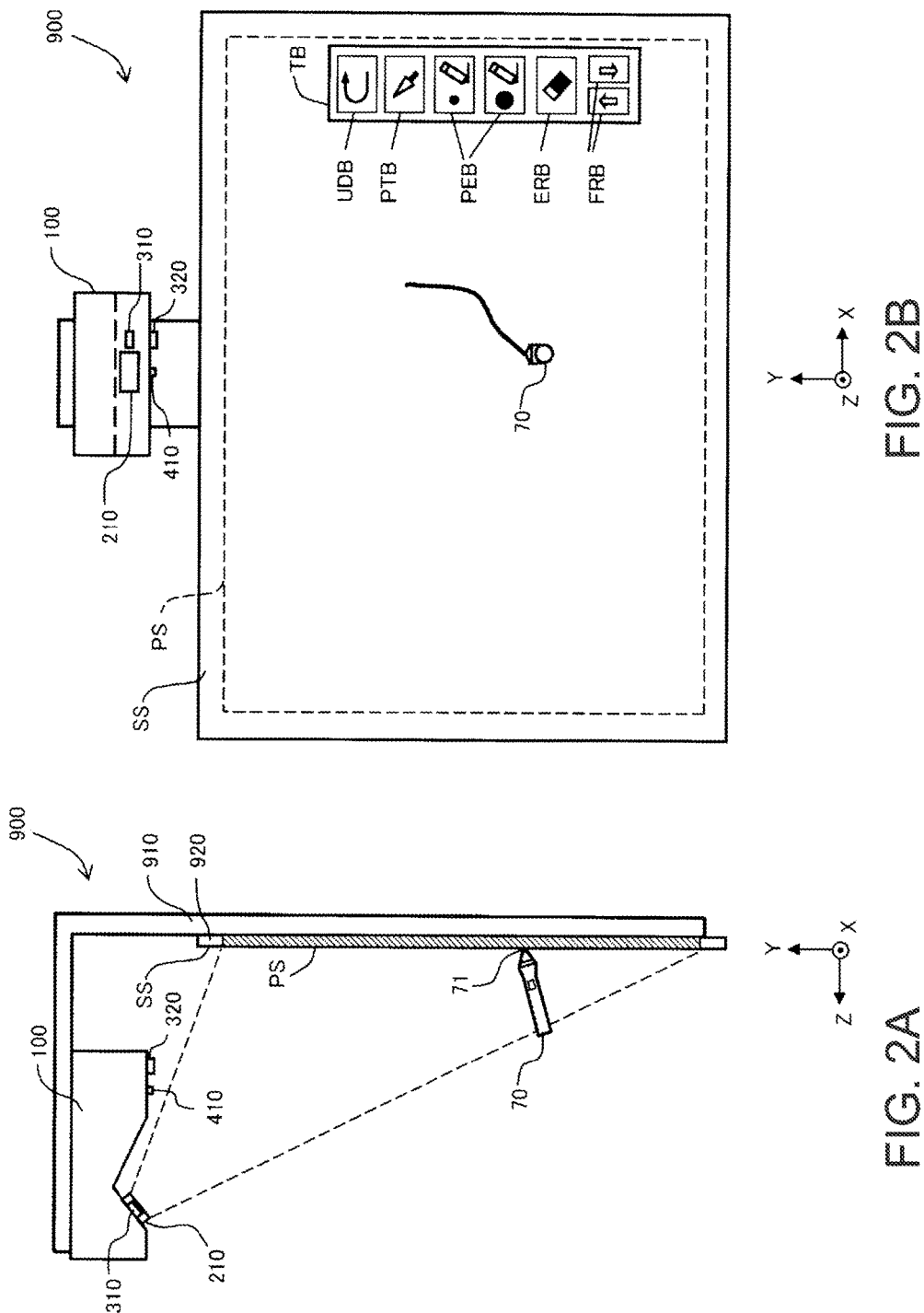
FIGS. 2A and 2B are a side view and a front view of the interactive projection system, respectively.

FIG. 2A is a side view of the interactive projection system. 900, and FIG. 2B is a front view thereof. In the present specification, a direction along a horizontal direction of the screen surface SS is defined as an X direction, a direction along a vertical direction of the screen surface SS is defined as a Y direction, and a direction along a normal line of the screen surface SS is defined as a Z direction. It should be noted that the X direction is also referred to as a "horizontal direction," the Y direction is also referred to as a "vertical direction," and the Z direction is also referred to as an "anteroposterior direction" for the sake of convenience. Further, among directions along the Y direction (the vertical direction), the direction, in which the projected screen PS is located, viewed from the projector 100 is referred to as a "downward direction." It should be noted that in FIG. 2A, the range of the projected screen PS out of the screen plate 920 is provided with hatching for the sake of convenience of graphical description.

The projector 100 includes a projection lens 210 for projecting the projected screen PS on the screen surface SS, a first camera 310 and a second camera 320 for taking images of the area of the projected screen PS, and a detection light irradiation section 410 for illuminating the pointing element 780 with the detection light. As the detection light, near infrared light, for example, is used. The two cameras 310, 320 each have at least a first imaging function of receiving light in a wavelength region, which includes the wavelength of the detection light, to perform imaging. It is preferable for at least one of the two cameras 310, 320 to be further provided with a second imaging function of receiving light including visible light to perform imaging, and to be configured so as to be able to switch between these two imaging functions. For example, it is preferable for each of the two cameras 310, 320 to be provided with a near infrared filter switching mechanism (not shown) capable of placing a near infrared filter, which blocks visible light and transmits only the near infrared light, in front of a lens and retracting the near infrared filter from the front of the lens. The two cameras 310, 320 are the same in the horizontal (the X direction) position, and are arranged side by side with a predetermined distance in the anteroposterior direction (the Z direction). The two cameras 310, 320 are not limited to those in the present embodiment. For example, it is also possible for the two cameras 310, 320 to be the same in the anteroposterior (the Z direction) position, and arranged side by side with a predetermined distance in the horizontal direction (the X direction). Further, it is also possible for the two cameras 310, 320 to be different in position in all of the X, Y, and Z directions, respectively. It is preferable to dispose the two cameras so as to be different in the position in the Z direction (so as to be shifted from each other in the anteroposterior direction) since the accuracy of the Z coordinate in the calculation of the three-dimensional position using the triangulation is high.

The example shown in FIG. 2B shows the state in which the interactive projection system 900 acts in a whiteboard mode. The whiteboard mode is a mode in which the user can arbitrarily draw a picture on the projected screen PS using the light-emitting pointing element 70 or the non-light-emitting pointing element 80. The projected screen PS including a toolbox TB is projected on the screen surface SS. The toolbox TB includes a cancel button UDB for undoing the process, a pointer button PTB for selecting a mouse pointer, pen buttons PEB for selecting the pen tool for drawing an image, an eraser button ERB for selecting an eraser tool for erasing the image having been drawn, and forward/backward buttons FRB for feeding the screen forward or backward. By touching these buttons using the pointing element, the user can perform processes corresponding to the respective buttons, or can select tools corresponding to the respective buttons. It should be noted that it is also possible to arrange that the mouse pointer is selected as a default tool immediately after starting up the system 900. In the example shown in FIG. 2B, there is described the appearance in which a line is being drawn in the projected screen PS by the user selecting the pen tool, and then moving the tip portion 71 of the light-emitting pointing element 70 within the projected screen PS in the state of having contact with the screen surface SS. The drawing of the line is performed by a projection image generation section (described later) disposed inside the projector 100.

It should be noted that the interactive projection system 900 can act in other modes than the whiteboard mode. For example, this system 900 can also act in a PC interactive mode for displaying an image of the data, which has been transferred from a personal computer (not shown) via a communication line, in the projected screen PS. In the PC interactive mode, an image of the data of, for example, spreadsheet software is displayed, and it becomes possible to perform input, generation, correction, and so on of the data using a variety of tools and icons displayed in the image.

Figure 3:
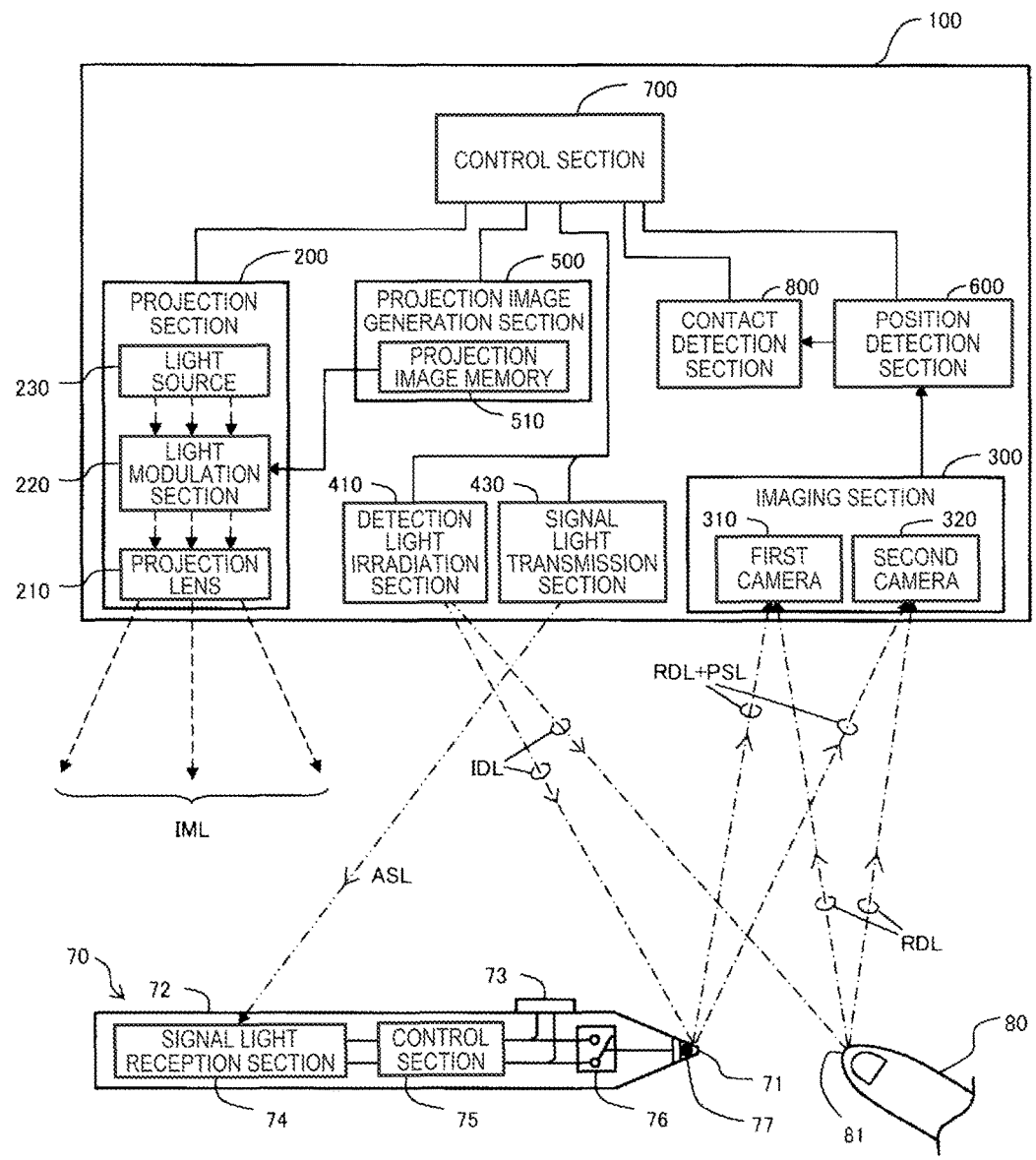
FIG. 3 is a block diagram showing an internal configuration of an interactive projector and a light-emitting pointing element.

FIG. 3 is a block diagram showing the internal configuration of the interactive projector 100 and the light-emitting pointing element 70. The projector 100 has a control section 700, a projection section 200, a projection image generation section 500, a position detection section 600, a contact detection section 800, an imaging section 300, a detection light irradiation section 410, and a signal light transmission section 430.

The control section 700 performs the control of each of the sections inside the projector 100. Further, the control section 700 determines the content of the instruction performed on the projected screen PS with the pointing element 780 based on the three-dimensional position of the pointing element 780 detected by the position detection section 600 and the contact detection of the pointing element 780 by the contact detection section 800, and at the same time commands the projection image generation section 500 to generate or change the projection image in accordance with the content of the instruction.

The projection image generation section 500 has a projection image memory 510 for storing the projection image, and has a function of generating the projection image to be projected on the screen surface SS by the projection section 200. The projection image generation section 500 is further provided with a function as a keystone distortion correction section for correcting a keystone distortion of the projected screen PS (FIG. 2B).

The projection section 200 has a function of projecting the projection image, which has been generated by the projection image generation section 500, on the screen surface SS. The projection section 200 has a light modulation section 220 and a light source 230 besides the projection lens 210 explained with reference to FIGS. 2A and 2B. The light modulation section 220 modulates the light from the light source 230 in accordance with the projection image data provided from the projection image memory 510 to thereby form projection image light IML. The projection image light IML is typically color image light including the visible light of three colors of RGB, and is projected on the screen surface SS by the projection lens 210. It should be noted that as the light source 230, there can be adopted a variety of types of light sources such as a light emitting diode or a laser diode besides the light source lamp such as a super-high pressure mercury lamp. Further, as the light modulation section 220, there can be adopted a transmissive or reflective liquid crystal panel, a digital mirror device, or the like, and it is also possible to adopt a configuration provided with a plurality of modulation sections 220 corresponding respectively to the colored light.

The detection light irradiation section 410 irradiates throughout the screen surface SS and the space in front of the screen surface SS with irradiating detection light IDL used for detecting the tip portion of the pointing element 780. As the irradiating detection light IDL, near infrared light, for example, is used.

The signal light transmission section 430 has a function of transmitting device signal light ASL as a near infrared signal used for synchronization. When the projector 100 is started up, the signal light transmission section 430 periodically emits the device signal light ASL. A tip light emitting section 77 of the light-emitting pointing element 70 emits pointing element signal light PSL as the near infrared light having a predetermined light emission pattern (light emission sequence) in sync with the device signal light ASL. Further, when performing the position detection of the pointing element 780, the cameras 310, 320 of the imaging section 300 perform imaging at predetermined timings synchronized with the device signal light ASL.

The imaging section 300 has the first camera 310 and the second camera 320 explained with reference to FIGS. 2A and 2B. As described above, the two cameras 310, 320 each have the function of receiving light in the wavelength region including the wavelength of the detection light to thereby perform imaging. In the example shown in FIG. 3, there is described the appearance in which the irradiating detection light IDL emitted by the detection light irradiation section 410 is reflected by the pointing element 780, and then the reflected detection light RDL is received by the two cameras 310, 320 to be imaged. The two cameras 310, 320 further receive the pointing element signal light PSL, which is the near infrared light emitted from the tip light emitting section 77 of the light-emitting pointing element 70, to thereby perform imaging. Imaging by the two cameras 310, 320 is performed in both of a first period in which the irradiating detection light IDL is emitted from the detection light irradiation section 410, and a second period in which the irradiating detection light IDL is not emitted from the detection light irradiation section 410.

It should be noted that it is preferable for at least one of the two cameras 310, 320 to be provided with a function of performing imaging using the light including the visible light in addition to a function of performing imaging using the light including the near infrared light. It is possible to take images of the projected screen PS projected on the screen surface SS with the cameras, and then make the projection image generation section 500 perform the keystone distortion correction using the images. Since the method of the keystone distortion correction using one or more cameras is well known, the explanation thereof will be omitted here.

The position detection section 600 has a function of analyzing the images (hereinafter also referred to as "taken images") taken by the two cameras 310, 320 to calculate the three-dimensional position coordinate of the tip portion of the pointing element 780 using the triangulation. On this occasion, the position detection section 600 compares the image in the first period and the image in the second period with each other to thereby determine which one of the light-emitting pointing element 70 and the non-light-emitting pointing element 80 corresponds to each of the pointing elements 780 included in the images. The details of the position detection section 600 will be described later.

The contact detection section 800 detects the contact of the pointing element 780 with the projected screen PS (the screen surface SS) based on the analysis result (the position coordinate) of the taken images by the position detection section 600. In the interactive projector 100 according to the present embodiment, the contact detection section 800 performs the detection of the contact of the light-emitting pointing element 70 with the projected screen PS based on the light emission pattern of the pointing element signal light PSL emitted by the light-emitting pointing element 70, and performs the detection of the contact of the non-light-emitting pointing element 80 with the projected screen PS based on the three-dimensional position coordinate detected by the position detection section 600.

The light-emitting pointing element 70 is provided with a signal light reception section 74, a control section 75, a tip switch 76, and the tip light emitting section 77 besides the button switch 73. The signal light reception section 74 has a function of receiving the device signal light ASL having been emitted from the signal light transmission section 430 of the projector 100. The tip switch 76 is a switch to be set to an ON state when the tip portion 71 of the light-emitting pointing element 70 is pushed, and set to an OFF state when the tip portion 71 is released. The tip switch 76 is normally in the OFF state, and is set to the ON state when the tip portion 71 of the light-emitting pointing element 70 has contact with the screen surface SS due to the contact pressure thereof. When the tip switch 76 is in the OFF state, the control section 75 makes the tip light emitting section 77 emit light with a specific first light emission pattern representing that the tip switch 76 is in the OFF state to thereby emit the pointing element signal light PSL having the first light emission pattern. In contrast, when the tip switch 76 becomes in the ON state, the control section 75 makes the tip light emitting section 77 emit light with a specific second light emission pattern representing that the tip switch 76 is in the ON state to thereby emit the pointing element signal light PSL having the second light emission pattern. Since the first light emission pattern and the second light emission pattern are different from each other, it is possible for the contact detection section 800 to obtain the analysis result of the images taken by the two cameras 310, 320 from the position detection section 600 to determine whether the tip switch 76 is in the ON state or in the OFF state based on the analysis result.

The button switch 73 of the light-emitting pointing element 70 has the same function as that of the tip switch 76. Therefore, the control section 75 makes the tip light emitting section 77 emit the light with the second light emission pattern described above in the state in which the user holds down the button switch 73, and makes the tip light emitting section 77 emit the light with the first light emission pattern described above in the state in which the button switch 73 is not held down. In other words, the control section 75 makes the tip light emitting section 77 emit the light with the second light emission pattern described above in the state in which at least one of the tip switch 76 and the button switch 73 is in the ON state, and makes the tip light emitting section 77 emit the light with the first light emission pattern described above in the state in which both of the tip switch 76 and the button switch 73 are in the OFF state.

It should be noted that it is also possible to arrange that a different function from that of the tip switch 76 is assigned to the button switch 73. For example, in the case in which the same function as that of a right-click button of the mouse is assigned to the button switch 73, when the user holds down the button switch 73, an instruction of the right click is transmitted to the control section 700 of the projector 100, and the process corresponding to the instruction is executed. In the case in which the different function from that of the tip switch 76 is assigned to the button switch 73 as described above, the tip light emitting section 77 emits light with four light emission patterns different from each other in accordance with the ON/OFF state of the tip switch 76 and the ON/OFF state of the button switch 73. In this case, it is possible for the light-emitting pointing element 70 to transmit the four combinations of the ON/OFF states of the tip switch 76 and the button switch 73 to the projector 100 while distinguishing the four combinations from one another.

Figure 4:
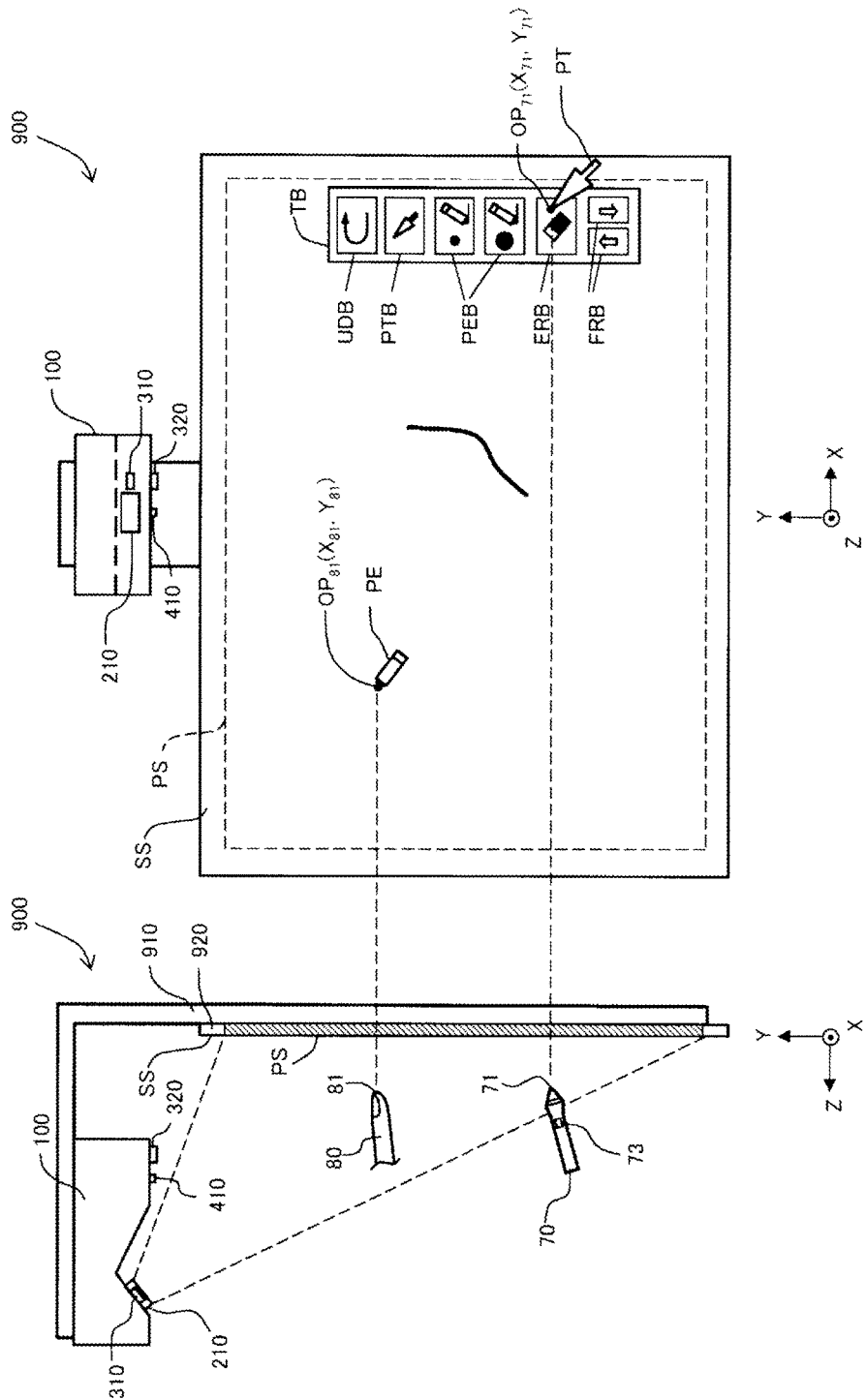
FIGS. 4A and 4B are explanatory diagrams showing an appearance of an operation using the light-emitting pointing element and a non-light-emitting pointing element.

FIGS. 4A and 4B are explanatory diagrams showing an appearance of an operation using the light-emitting pointing element 70 and the non-light-emitting pointing element 80. In this example, both of the tip portion 71 of the light-emitting pointing element 70 and the tip portion 81 of the non-light-emitting pointing element 80 are separated from the screen surface SS. The X-Y coordinate $(X_{71}, Y_{71})$ of the tip portion 71 of the light-emitting pointing element 70 is located above the eraser button ERB of the toolbox TB. Further, here, the mouse pointer PT is selected as a tool for representing the function of the tip portion 71 of the light-emitting pointing element 70, and the mouse pointer PT is drawn in the projected screen PS so that the tip $OP_{71}$ of the mouse pointer PT exists on the eraser button ERB. As described above, the three-dimensional position of the tip portion 71 of the light-emitting pointing element 70 is determined by the triangulation using the images taken by the two cameras 310, 320. Therefore, on the projected screen PS, the mouse pointer PT is drawn so that the operation point $OP_{71}$ located at the tip of the mouse pointer PT is disposed at the position of the X-Y coordinate $(X_{71}, Y_{71})$ out of the three-dimensional coordinate $(X_{71}, Y_{71}, Z_{71})$ of the tip portion 71 determined by the triangulation. In other words, the tip $OP_{71}$ of the mouse pointer PT is disposed at the X-Y coordinate $(X_{71}, Y_{71})$ out of the three-dimensional coordinate $(X_{71}, Y_{71}, Z_{71})$ of the tip portion 71 of the light-emitting pointing element 70, and the instruction of the user is performed at this position. For example, it is possible for the user to select the eraser tool by making the tip portion 71 of the light-emitting pointing element 70 have contact with the surface of the projected screen PS in this state. Further, it is also possible for the user to select the eraser tool by holding down the button switch 73 of the light-emitting pointing element 70 in this state. As described above, in the present embodiment, even in the case in which the light-emitting pointing element 70 is in the state of being separated from the screen surface SS, it is possible to provide the instruction, which corresponds to the content of the projected screen PS in the operation point $OP_{71}$ located at the X-Y coordinate $(X_{71}, Y_{71})$ of the tip portion 71, to the projector 100 by holding down the button switch 73.

In FIG. 4B, the pen tool PE is further selected as the tool representing the function of the tip portion 81 of the non-light-emitting pointing element 80, and the pen tool PE is drawn in the projected screen PS. As described above, the three-dimensional position of the tip portion 81 of the non-light-emitting pointing element 80 is also determined by the triangulation using the images taken by the two cameras 310, 320. Therefore, on the projected screen PS, the pen tool PE is drawn so that the operation point $OP_{81}$ located at the tip of the pen tool PE is disposed at the position of the X-Y coordinate ($X_{81}$, $Y_{81}$) out of the three-dimensional coordinate ($X_{81}$, $Y_{81}$, $Z_{81}$) of the tip portion 81 determined by the triangulation. It should be noted that when the user provides the instruction to the projector 100 using the non-light-emitting pointing element 80, the instruction (e.g., drawing or selection of the tool) is performed in the state of making the tip portion 81 of the non-light-emitting pointing element 80 have contact with the projected screen PS.

In the example shown in FIGS. 4A and 4B, even in the case in which the tip portions of the pointing elements 780 are separated from the projected screen PS, the tool (e.g., the mouse pointer PT or the pen tool PE) selected by each of the pointing elements is drawn in the projected screen PS to thereby be displayed. Therefore, there is an advantage that it is easy to understand what tools are selected by the pointing elements even in the case in which the user does not make the tip portions of the pointing elements have contact with the projected screen PS, and thus, the operation is easy. Further, since the tool is drawn so that the operation point OP of the tool is disposed at the position of the X-Y coordinate out of the three-dimensional coordinate of the tip portion of the pointing element, there is an advantage that the user can appropriately recognize the position of the tool in use.

It should be noted that the interactive projection system 900 can also be configured so that two or more light-emitting pointing elements 70 can simultaneously be used. In this case, the light emission patterns of the pointing element signal light PSL described above are preferably unique light emission patterns with which the two or more light-emitting pointing elements 70 can be identified. More specifically, in the case in which the N (N is an integer equal to or greater than two) light-emitting pointing elements 70 can be used at the same time, the light emission patterns of the pointing element signal light PSL are preferably the patterns with which the N light-emitting pointing elements 70 can be distinguished from one another. It should be noted that in the case in which a plurality of unit light emission periods is included in a set of light emission patterns, two values, namely emission and non-emission, can be expressed in each of the unit light emission periods. Here, each of the unit light emission periods corresponds to the period for expressing 1-bit information, namely the ON/OFF state of the tip light emitting section 77 of the light-emitting pointing element 70. In the case in which the set of light emission patterns are each formed of M (M is an integer equal to or greater than 2) unit light emission periods, $2^M$ states can be distinguished by the set of light emission patterns. Therefore, it is preferable for the number M of the unit light emission periods constituting each of the set of light emission patterns to be set so as to fulfill the following formula.

$$N \times Q \leq 2^M \quad (1)$$

Here, Q denotes the number of the states distinguished by the switches 73, 76 of the light-emitting pointing element 70, and in the example of the present embodiment, Q=2 or Q=4 is set. For example, in the case of Q=4, it is preferable that M is set to an integer equal to or greater than 3 if N is 2, and M is set to an integer equal to or greater than 4 if N is 3 to 4. In this case, when the position detection section 600 (or the control section 700) identifies the N light-emitting pointing elements 70, and the states of the switches 73, 76 of each of the light-emitting pointing elements 70, the identification is performed using the M images taken by each of the cameras 310, 320 in the M unit light emission periods of the set of light emission patterns. It should be noted that the M-bit light emission pattern is a pattern of setting the pointing element signal light PSL to an ON state or an OFF state in the state of keeping the irradiating detection light IDL in the OFF state, and the non-light-emitting pointing element 80 does not show in the image taken by the cameras 310, 320. Therefore, in order to take an image used for detecting the position of the non-light-emitting pointing element 80, it is preferable to further add a 1-bit unit light emission period in which the irradiating detection light IDL is set to the ON state. It should be noted that in the unit light emission period for position detection, the pointing element signal light PSL can be in either of the ON state and the OFF state. The image obtained in the unit light emission period for the position detection can also be used for the position detection of the light-emitting pointing element 70.

The five specific examples of the signal light described in FIG. 3 are summed up as follows.

(1) Projection Image Light IML: the image light (visible light) projected on the screen surface SS by the projection lens 210 in order to project the projected screen PS on the screen surface SS.

(2) Irradiating Detection Light IDL: the near infrared light with which the detection light irradiation section 410 irradiates throughout the screen surface SS and the space in front of the screen surface SS for detecting the tip portions of the pointing elements 780 (the light-emitting pointing element 70 and the non-light-emitting pointing element 80).

(3) Reflected Detection Light RDL: the near infrared light reflected by the pointing elements 780 (the light-emitting pointing element 70 and the non-light-emitting pointing element 80), and then received by the two cameras 310, 320 out of the near infrared light emitted as the irradiating detection light IDL.

(4) Device Signal Light ASL: the near infrared light periodically emitted from the signal light transmission section 430 of the projector 100 in order to synchronize the projector 100 and the light-emitting pointing element 70 with each other.

(5) Pointing Element Signal Light PSL: the near infrared light emitted from the tip light emitting section 77 of the light-emitting pointing element 70 at the timing synchronized with the device signal light ASL. The light emission pattern of the pointing element signal light PSL is changed in accordance with the ON/OFF states of the switches 73, 76 of the light-emitting pointing element 70. Further, the unique light emission patterns for identifying the plurality of light-emitting pointing elements 70 are provided.

In the present embodiment, the position detection of the tip portions of the light-emitting pointing element 70 and the non-light-emitting pointing element 80, and the determination of the contents instructed by the light-emitting pointing element 70 and the non-light-emitting pointing element 80 are respectively performed as follows.

The three-dimensional position of the tip portion 71 of the pointing element 780 is determined by the position detection section 600 due to the triangulation using the images taken by the two cameras 310, 320. On this occasion, whether the pointing element is the light-emitting pointing element 70 or the non-light-emitting pointing element 80 can be recognized by determining whether or not the light emission pattern of the tip light emitting section 77 appears in the images taken at a predetermined plurality of timings. In the case of the light-emitting pointing elements 70, the taken images each include the pointing element signal light PSL emitted from the tip light emitting sections 77 disposed in the respective tip portions 71 of the light-emitting pointing elements 70. Therefore, the three-dimensional position ($X_{71}$, $Y_{71}$, $Z_{71}$) of the tip portion 71 of each of the light-emitting pointing element 70 is calculated with the triangulation based on bright points included in the taken images.

In contrast, in the case of the non-light-emitting pointing element 80, the taken images each include the reflected detection light RDL reflected by the non-light-emitting pointing element 80. The positions of the tip portion 81 of the non-light-emitting pointing element 80 in the two images respectively taken by the two cameras 310, 320 is determined using template matching. The detection of the tip position of the non-light-emitting pointing element 80 will be described later.

The contact detection section 800 performs the contact detection of the non-light-emitting pointing element 80 in accordance with whether or not the difference between the Z coordinate value of the non-light-emitting pointing element 80 determined by the triangulation and the Z coordinate value of the screen surface SS is equal to or smaller than a minute allowable tolerance, namely whether or not the tip portion 81 of the non-light-emitting pointing element 80 is sufficiently close to the screen surface SS. As the allowable tolerance, it is preferable to use a small value in a range of, for example, about 2 mm through 6 mm. Further, the contact detection section 800 determines whether or not the tip portion 71 of the light-emitting pointing element 70 has contact with the screen surface SS (i.e., whether or not the tip switch 76 is in the ON state) using the light emission pattern of the tip light emitting section 77 in the images taken at the plurality of timings described above. It should be noted that the contact detection of the light-emitting pointing element 70 can also be performed based on the Z coordinate of the tip portion 71 of the light-emitting pointing element 70 similarly to the contact detection of the non-light-emitting pointing element 80.

When the detection of the three-dimensional positions, the determination of the ON/OFF state of each of the button switches 73, and the contact detection of the tip portions of the pointing elements 780 are completed, the control section 700 determines the instruction content by the pointing elements 780 (the light-emitting pointing elements 70, the non-light-emitting pointing element 80) based on the detection results of the position detection section 600 and the contact detection section 800, then makes the projection image generation section 500 generate the image corresponding to the instruction content, and then makes the projection section 200 project the image corresponding to the instruction content on the screen surface SS. For example, in the case in which the tip switch 76 or the button switch 73 becomes in the ON state in the state in which the position of the X-Y coordinate of the tip portion 71 is located on any of the buttons in the toolbox TB (FIG. 2B), the tool of that button is selected. Further, as shown in FIG. 2B as an example, if the tip switch 76 or the button switch 73 turns to the ON state in the state in which the X-Y coordinate of the tip portion 71 is located at a position outside the toolbox TB in the projected screen PS, the process (e.g., drawing) using the tool thus selected is selected. The control section 700 makes the projection image generation section 500 draw a pointer or a mark selected in advance so that the pointer or the mark is disposed at the position ($X_{71}$, $Y_{71}$) or ($X_{81}$, $Y_{81}$) in the projected screen PS using the X-Y coordinate ($X_{71}$, $Y_{71}$) of the tip portion 71 of the light-emitting pointing element 70 or the X-Y coordinate ($X_{81}$, $Y_{81}$) of the tip portion 81 of the non-light-emitting pointing element 80. Further, the control section 700 performs the process corresponding to the content instructed by the light-emitting pointing element 70 or the non-light-emitting pointing element 80, and then makes the projection image generation section 500 draw the image including the processing result.

B. Position Detection Section According to First Embodiment (Template Size is Varied in Accordance with Local Magnification)

Figure 5:
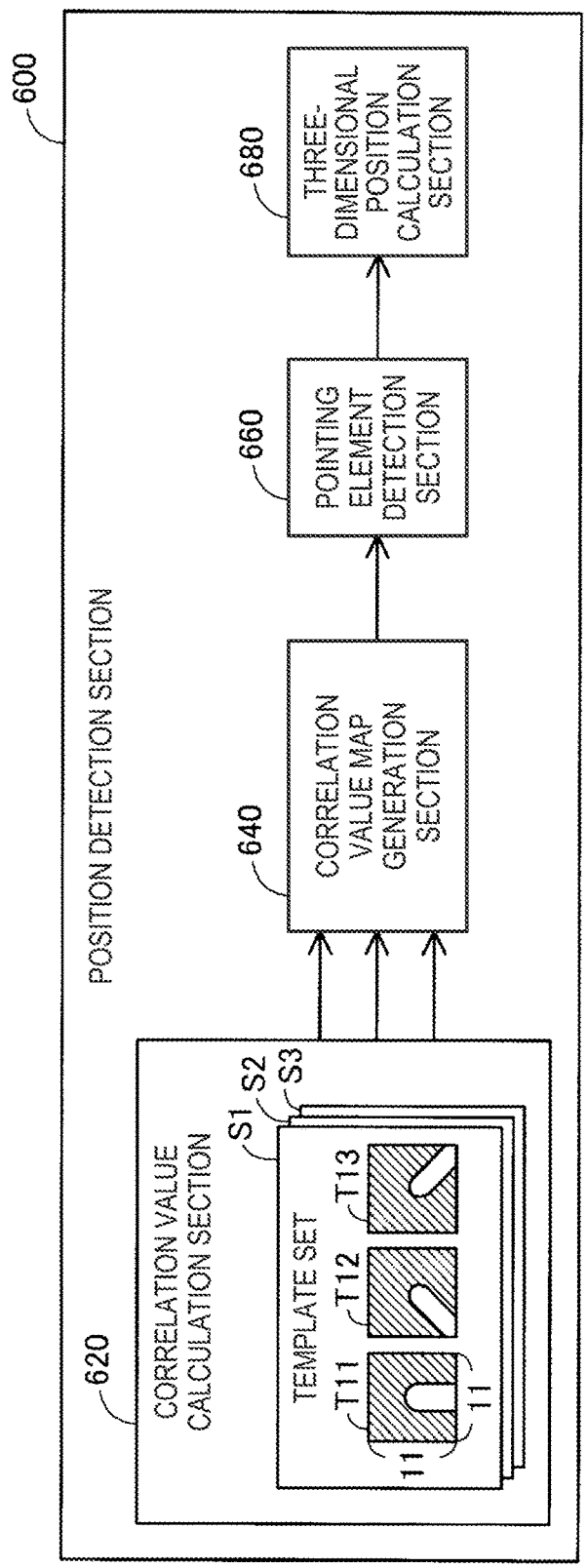
FIG. 5 is a block diagram showing a schematic configuration of a position detection section.

FIG. 5 is a block diagram showing a schematic configuration of the position detection section 600 (FIG. 3). The position detection section 300 is provided with a correlation value calculation section 620, a correlation value map generation section 640, a pointing element detection section 660, and a three-dimensional position calculation section 680. The correlation value calculation section 620 is provided with a plurality of template sets (here, three template sets S1 through S3). Each of the template sets is provided with a plurality of types of template images (in the template set S1 shown in FIG. 5, three types of template images T11 through T13). Hereinafter, in the case in which the three template sets S1 through S3 are not discriminated from each other, the template sets are also referred to as template sets S. Further, in the case in which the three types of template images T11 through T13 are not discriminated from each other, the template images are also referred to as template images T. The correlation value calculation section 620 calculates a correlation value between the taken image obtained by imaging the area of the projected screen PS with the imaging section 300 and each of the template image T. The correlation value calculation section 620 calculates three types of correlation values corresponding respectively to the three template images T11 through T13 with respect to each of the first taken image taken by the first camera 310 and the second taken image taken by the second camera 320. In other words, in the correlation value calculation section 620, totally six types of correlation values are calculated with respect to one imaging timing.

In the present embodiment, the correlation value calculation section 620 separates the taken image into a plurality of small areas (described later), and then calculates the correlation values using the template sets S different from each other between the small areas.

Figure 6:
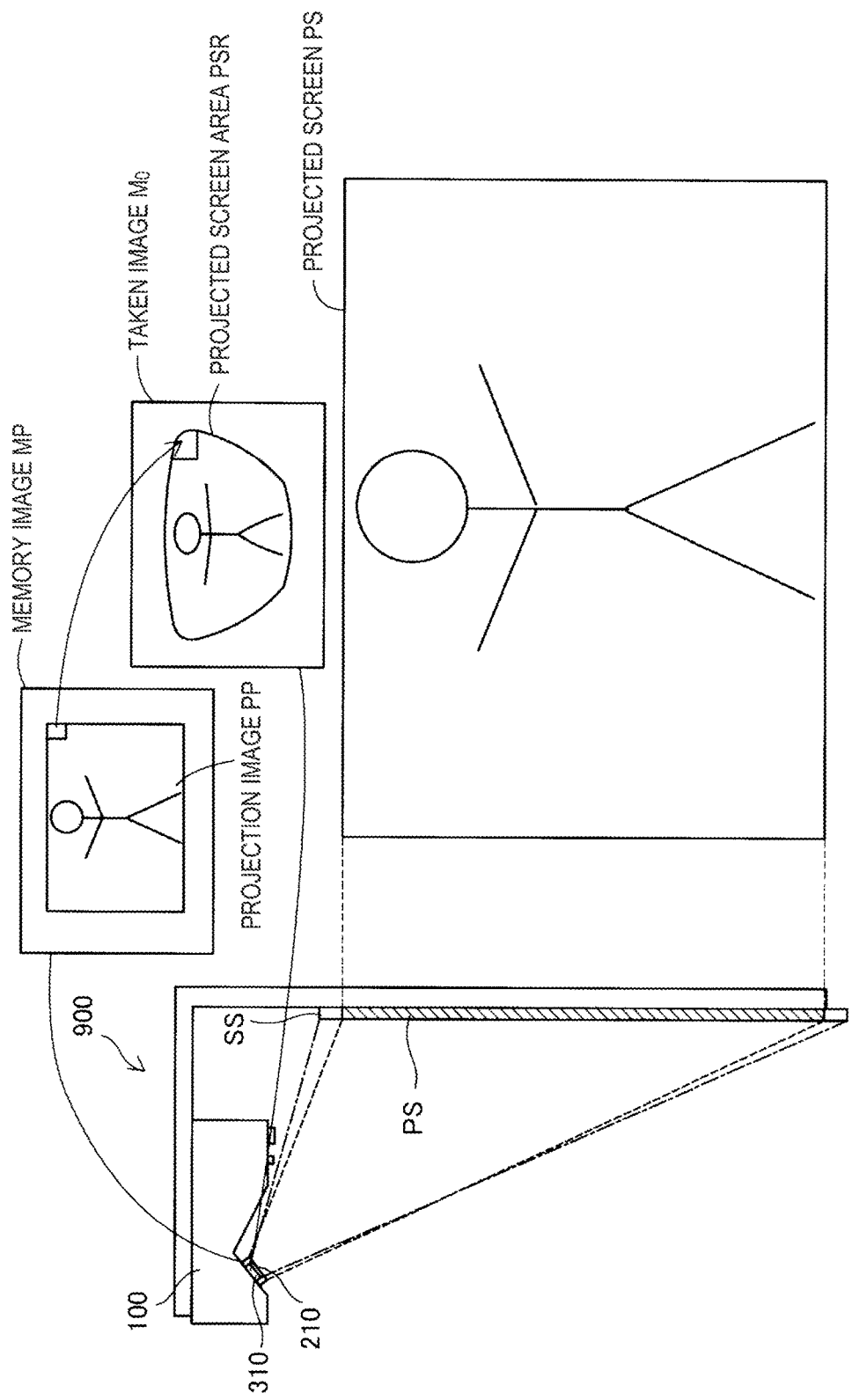
FIG. 6 is an explanatory diagram of a relationship between a memory image, a projected screen, and a taken image.

FIG. 6 is an explanatory diagram for explaining the relationship between a memory image MP, the projected screen PS, and the taken image $M_0$. In FIG. 6, there is shown the memory image MP generated in the projection image generation section 500 (FIG. 3), and drawn in the projection image memory 510 (FIG. 3). The interactive projector 100 is a so-called ultra short focus projector, and is provided with an optical design of the projection section 200 (the projection lens 210 and a curved mirror (not shown)) for achieving the projection of the projected screen having an appropriate rectangular shape on the projection screen surface SS without the keystone distortion correction even in the case in which the arrangement of the projection lens 210 to the projection screen surface SS has the arrangement shown in FIG. 6. Therefore, the projection image PP is an image on which the keystone distortion correction is not performed, and which has a rectangular shape similar to, for example, an image transmitted from a personal computer via a communication line. It should be noted that the projection image PP can also have a rectangular shape coinciding with the memory image MP. The projected screen PS on the screen surface SS includes an image having a rectangular shape formed by enlarging the projection image PP in the entire area of the projected screen PS. The area (a projected screen area PSR) of the taken image $M_0$, taken by the first camera taking the image of the projected screen PS, in the projected screen includes the keystone distortion due to the imaging direction and the barrel distortion based on the distortion aberration of the imaging lens. In the present embodiment, the memory image MP and the taken image $M_O$ form rectangular shapes, which have the same number of pixels and are similar to each other. In the present embodiment, the magnification of the area corresponding to the projected screen area PSR of the taken image $M_O$ with respect to each of the local areas of the projection image PP of the memory image MP is referred to as a local magnification M. The local magnification M is calculated using a distortion correction coefficient calculated in the calibration using the taken image by the imaging section 300. It should be noted that the method of the calibration is well known, the explanation thereof is omitted here. The projection image memory 510 according to the present embodiment corresponds to a projected screen storage section in the appended claims, the projected screen area PSR of the taken image $M_O$ corresponds to a projected screen included in the taken image in the appended claims, and the local magnification M corresponds to a deformation ratio in the appended claims.

Figure 7:
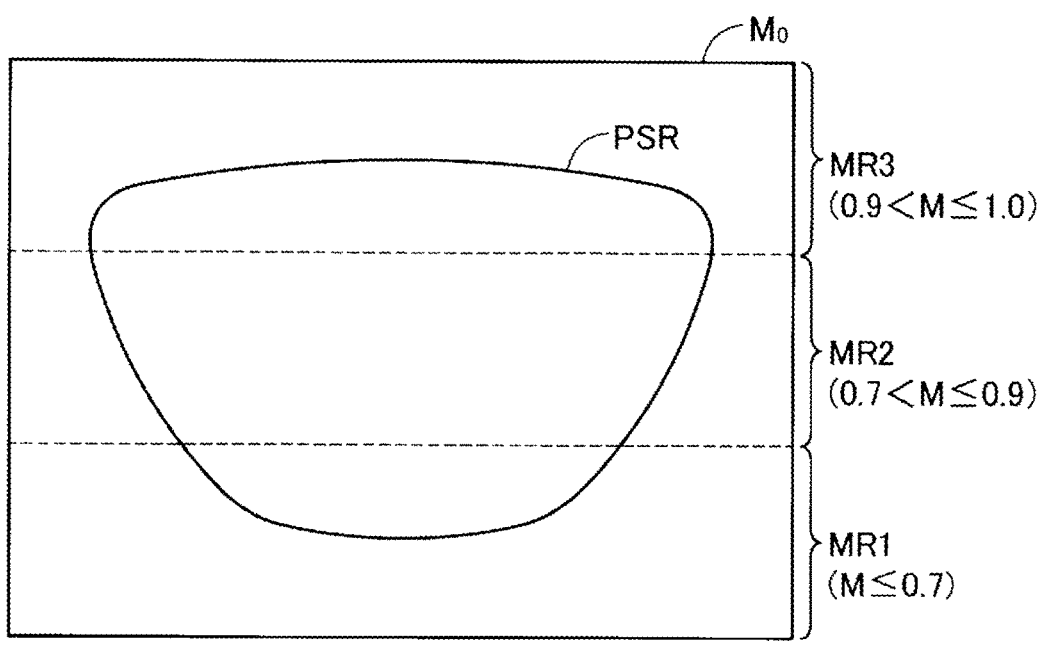
FIG. 7 is an explanatory diagram of a small area in a first embodiment of the invention.

FIG. 7 is an explanatory diagram for explaining the small areas according to the first embodiment. FIG. 7 schematically shows the taken image $M_O$ shown in FIG. 6. In the present embodiment, the taken images $M_O$ is sectioned into three small areas MR1 through MR3 each parallel to the long side of the taken image $M_O$ based on the local magnification M of the projected screen area PSR. The small area MR1 is an area with the local magnification M satisfying M≤0.7, the small area MR2 is an area with the local magnification M satisfying 0.7<M≤0.9, the small area MR3 is an area with the local magnification M satisfying 0.9<M≤1.0. It should be noted that although in the present embodiment, there is explained an example of sectioning the taken image $M_O$ into the three small areas MR1 through MR3 in order to make the explanation easy, the number of the small areas can also be set to 2, or to be equal to or greater than 4. Further, the small areas are not limited to the small areas sectioned in parallel to the long side of the taken image $M_O$, but can also be sectioned in, for example, a reticular pattern. Further, the local magnification M is not limited to the value of the present embodiment, but can also be set to M>1.0.

In the interactive projector 100, when performing the template matching, in at least one of the small areas MR, there is used a parameter different from parameters in the rest of the small areas MR. The parameter is, for example, the size (scale size) of the template image, the type of the template image (the direction of the pointing element), the resolution conversion magnification of a target image (taken image) when performing the template matching, weighting when adding a plurality of correlation values, a threshold value used when binarizing the correlation value map (described later), the number of pixels in the high correlation value area (described later) used when detecting the pointing element, or the cutoff frequency of a low-pass filter. In the present embodiment, the size (scale size) of the template image is used as the parameter different between the small areas.

Figure 8A:
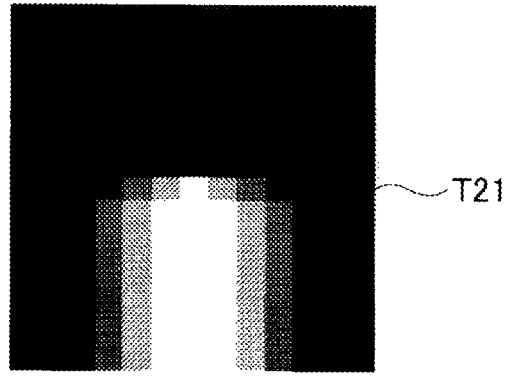
FIGS. 8A through 8C are diagrams each showing a template image.
Figure 8B:
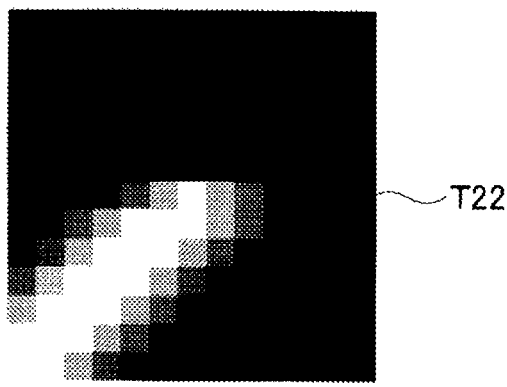
Figure 8C:
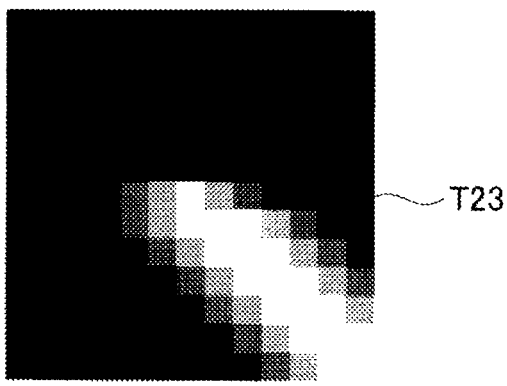

FIGS. 8A through 8C are diagrams showing the template images T21 through T23 provided to the second template set S2. Hereinafter, the $n^{th}$ (n=1, 2, or 3) type template T of the $m^{th}$ (m=1, 2, or 3) template set Sm is referred to as the template Tmn. It should be noted that in the case in which the template set is not limited, the $n^{th}$ type template T is also referred to simply as the template Tn. In the present embodiment, a finger is assumed as the non-light-emitting pointing element 80. The template images T of the second template set S2 are each formed of 13×13 pixels, and are each generated so that the tip of the finger coincides with the central pixel of the template image T. The first type template image T21 (FIG. 8A) is an image of the finger with the tip pointed upward. The second type template image T22 (FIG. 8B) is an image of the finger with the tip pointed obliquely upward right. The third template image T23 (FIG. 8C) is an image of the finger with the tip pointed obliquely upward left. The angle formed between the finger and the lower side of the template image in the second type template image T22 and the third type template image T23 is 45 degrees. It should be noted that the template images are not limited to those in the present embodiment, but a variety of types of template images can be used. For example, it is also possible to further include images of the finger with the tip pointed obliquely upward right and having the angle formed between the finger and the lower side of the template images set to 30 degrees and 60 degrees, respectively, and images of the finger with the tip pointed obliquely upward left and having the angle formed between the finger and the lower side of the template images set to 30 degrees and 60 degrees, respectively. Further, the size of each of the template images T can also be set arbitrarily. In the present embodiment, in order to simplify the explanation, the explanation will be presented showing an example of using the three types of template images T21 through T23.

The rest of the template sets, namely the template sets S1, S3 are each provided with three template images T similarly to the second template set S2, but these template images T are different in size from the template images T of the second template set S2. The size of the template images T of the first template set S1 is 11×11 pixels, and the size of the template images T of the third template set S3 is 15×15 pixels.

Figure 9:
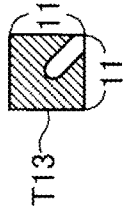
FIG. 9 is an explanatory diagram of a correspondence between small areas and template sets.

FIG. 9 is an explanatory diagram for explaining the correspondence between each of the small areas MR1 through MR3 (FIG. 7) and the template sets Sm. In the correlation value calculation section 620 (FIG. 5), regarding the pixels of the small area MR1 of the taken image $M_O$, the correlation values are calculated using the first template set S1. Regarding the pixels of the small area MR2 of the taken image $M_O$, the correlation values are calculated using the second template set S2. Regarding the pixels of the small area MR3 of the taken image $M_O$, the correlation values are calculated using the third template set S3.

The correlation value map generation section 640 (FIG. 5) generates the correlation value map by adding the correlation values calculated in the correlation value calculation section 620 for each of the taken images. Specifically, the first correlation value map with respect to the first taken image and the second correlation value map with respect to the second taken image are generated.

The pointing element detection section 660 detects the tip position (the two-dimensional position) of the non-light-emitting pointing element 80 (the finger) for each of the taken images based on each of the correlation value maps. In the present embodiment, the position of the pixel having the local maximum value in the correlation value map is defined as the tip position of the pointing element 80.

The three-dimensional position calculation section 680 calculates the three-dimensional position of the tip of the non-light-emitting pointing element 80 using the triangulation based on the tip position (the two-dimensional position) of the non-light-emitting pointing element 80 detected for each of the taken images in the pointing element detection section 660.

Figure 10:
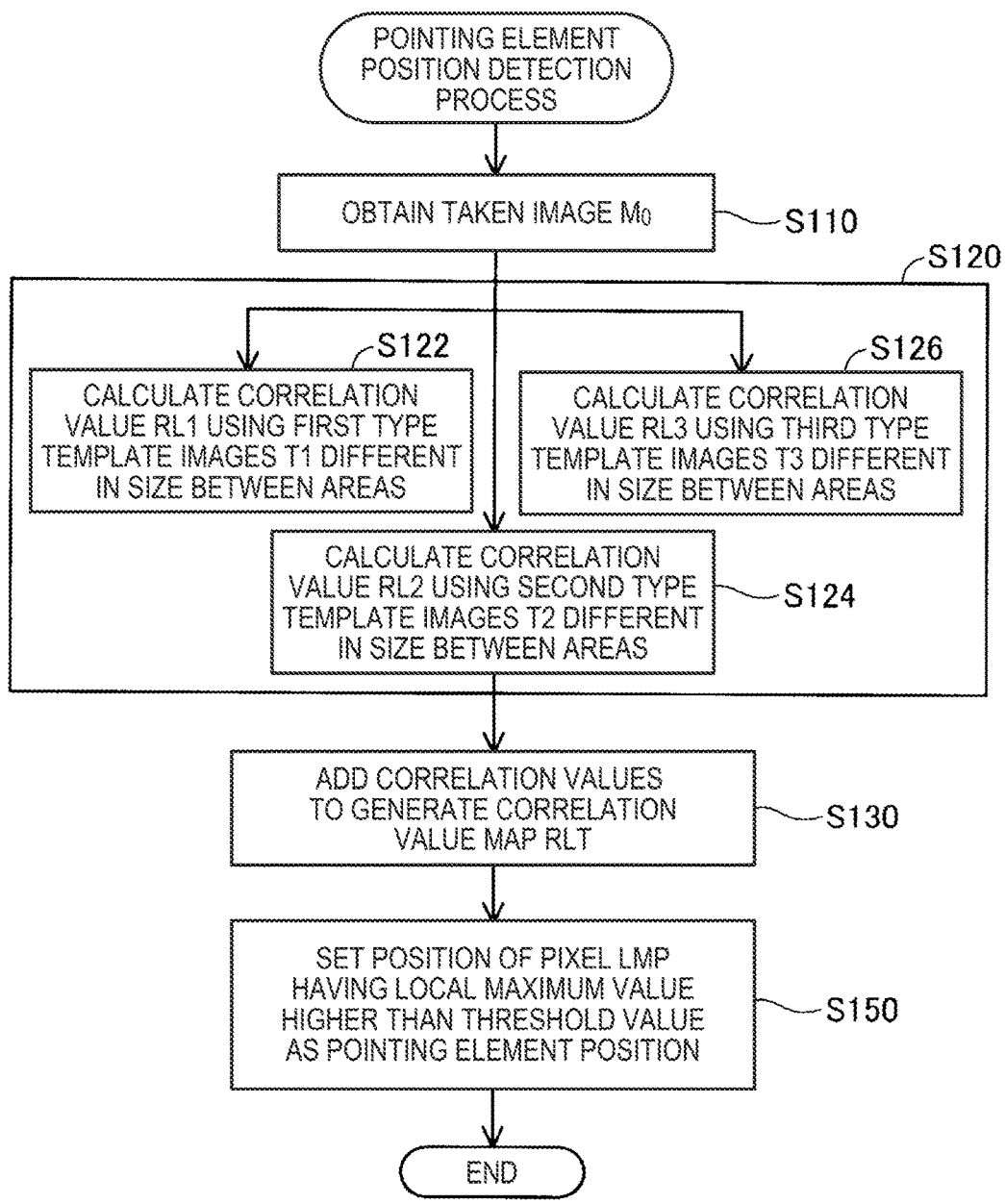
FIG. 10 is a flowchart showing a pointing element position detection process related to the non-light-emitting pointing element.
Figure 11:
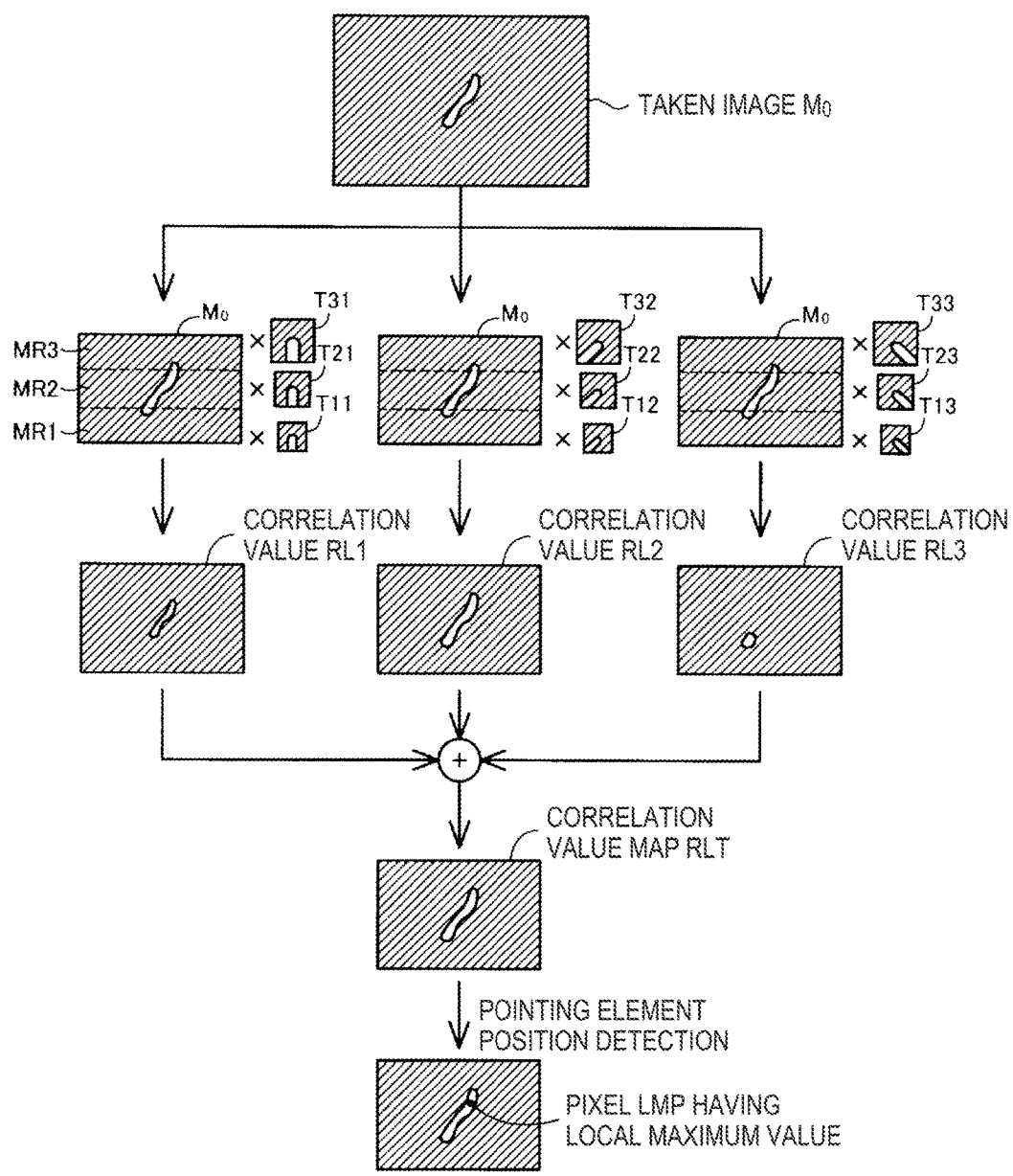
FIG. 11 is an explanatory diagram of the pointing element position detection process.

FIG. 10 is a flowchart showing the flow of a pointing element position detection process related to the non-light-emitting pointing element 80. FIG. 11 is an explanatory diagram for explaining the pointing element position detection process.

The correlation value calculation section 620 obtains (step S110 in FIG. 10) the taken image $M_0$ (FIG. 11) from the imaging section 300. As described above, the imaging section 300 receives the reflected detection light RDL, which has been reflected by the non-light-emitting pointing element 80, to perform imaging. Therefore, although in reality, the whole of the hand including the finger is included in the taken image, FIG. 11 shows the finger part included in the taken image in a simplified manner. In the pointing element position detection process, the tip of the finger is detected from the hand included in the taken image $M_0$.

The correlation value calculation section 620 calculates (step S120 in FIG. 10) the correlation value between the taken image $M_0$ and the template image T pixel by pixel. In the step S120, the correlation value calculation section 620 performs the process (step S122) for calculating the correlation value RL1 between the first type template image T1 and the taken image $M_0$, the process (step S124) for calculating the correlation value RL2 between the second type template image T2 and the taken image $M_0$, and the process (step S126) for calculating the correlation value RL3 between the third type template image T3 and the taken image $M_0$ in parallel to each other.

In the step S120, the correlation value calculation section 620 calculates the correlation values using the template sets S different in scale size from each other with respect to each of the three small areas MR1 through MR3 of the taken image $M_0$. Specifically, the correlation value calculation section 620 uses (FIG. 11) the template set S1 (FIG. 9, 11×11 pixels) with respect to the pixels in the small area MR1, the template set S2 (FIG. 9, 13×13 pixels) with respect to the pixels in the small area MR2, and the template set S3 (FIG. 9, 15×15 pixels) with respect to the pixels in the small area MR3.

As a result, as shown in FIG. 11, the correlation values RL1, RL2, and RL3 different from each other by the type of the template image can be obtained. In the present embodiment, the correlation values are calculated for each of the pixels of the taken image $M_0$ using convolution (a convolution operation). The calculation method of the correlation values is not limited to one in the present embodiment, but it is possible to calculate the correlation values using a well known method such as SSD (sum of squared difference; sum of squares of the differences between the pixel values) or SAD (sum of absolute difference; sum of absolute values of the differences between the pixel values). It should be noted that the more approximate the taken image and the template image are, the smaller the values calculated using SSD, SAD become, and in the case in which the taken image and the template image completely coincide with each other, the values become 0. Therefore, in order to realize the state that the more approximate the taken image and the template image are, the larger the correlation value becomes similarly to the correlation value due to the convolution, it is preferable to use a reciprocal number. The convolution can reduce the amount of calculation compared to other methods, and is therefore preferable.

The correlation value map generation section 640 adds the correlation values RL1, RL2, and RL3 to each of the pixels of the taken image $M_0$ to generate (step S130 in FIG. 10) the correlation value map RLT. In such a manner as described above, there is generated the correlation value map RLT (FIG. 11) representing the correlation values between the three types of template images T1 through T3 and the taken image $M_0$. FIG. 11 shows the correlation value map RLT in a simplified manner similarly to the taken image $M_0$.

The pointing element detection section 660 detects (step S150 in FIG. 10) the position of the pixel LMP (FIG. 11) having a local maximum value higher than the threshold value Th in the correlation value map RLT as the tip position of the pointing element. Although in the present embodiment, the threshold value Th is set as Th=180, the threshold value can arbitrarily be set in accordance with the sensitivity of the imaging section 300, the distance between the imaging section 300 and the screen surface SS, and so on. For example, since the shorter the distance between the imaging section 300 and the screen surface SS is, the higher luminance (the larger pixel values) the non-light-emitting pointing element 80 is imaged with, it is also possible to set the threshold value Th so that the shorter the distance between the imaging section 300 and the screen surface SS is, the higher the threshold value Th is.

The three-dimensional position calculation section 680 calculates the three-dimensional position $(X_{81}, Y_{81}, Z_{81})$ of the tip portion 81 of the non-light-emitting pointing element 80 using the triangulation based on the pointing element positions respectively detected in the first taken image and the second taken image.

As described above, the projected screen area PSR of the taken image $M_0$ has the distortion due to the imaging direction of the imaging section 300 and the distortion due to the imaging lens (FIG. 7). Therefore, the size of the non-light-emitting pointing element 80 included in the taken image $M_0$ is different in accordance with the local magnification M of the projected screen area PSR (FIG. 6) of the taken image $M_0$ with respect to the projection image PP (FIG. 6) of the memory image MP. For example, in the case in which the non-light-emitting pointing element 80 (the finger) is included in the small area MR3 ($0.9 < M \le 1.0$) of the taken image $M_0$, the size of the non-light-emitting pointing element 80 is larger compared to the case in which the non-light-emitting pointing element 80 (the finger) is included in the small area MR2 ($0.7 < M \le 0.9$). In the present embodiment, regarding the pixels of the small area MR3 of the taken image $M_0$, the correlation values are calculated using the template set S1 with the template images T having a size of 15×15 pixels, and regarding the pixels of the small area MR2 of the taken image $M_0$, the correlation values are calculated using the template set S2 with the template images T having a size of 13×13 pixels. In other words, in the interactive projector 100 according to the present embodiment, when calculating the correlation values in the correlation value calculation section 620, the correlation values are calculated using the template images T having the size (scale size) suitable for the size of the non-light-emitting pointing element 80 included in each of the small areas MR obtained by sectioning the taken image $M_0$ based on the local magnification M, and therefore, higher correlation values can be obtained. As a result, the detection accuracy of the non-light-emitting pointing element 80 can be improved.

Further, in the present embodiment, when detecting the non-light-emitting pointing element 80 included in the taken image $M_0$ by the template matching using the plurality of types of template images T, the correlation values RL1, RL2, and RL3 between the respective template images T and the taken image $M_0$ are added to each other for each of the pixels of the taken image $M_0$ to thereby generate the correlation value map representing the correlation between the plurality of template images T and the taken image $M_0$. In the case of performing the template matching using a plurality of template images, the calculation becomes easier compared to the case of selecting the image exhibiting a high correlation value, and therefore, speeding up of the detection processing of the non-light-emitting pointing element 80 can be achieved.

C. Position Detection Section According to Second Embodiment (Image Resolution is Varied in Accordance with Local Magnification)

Figure 12:
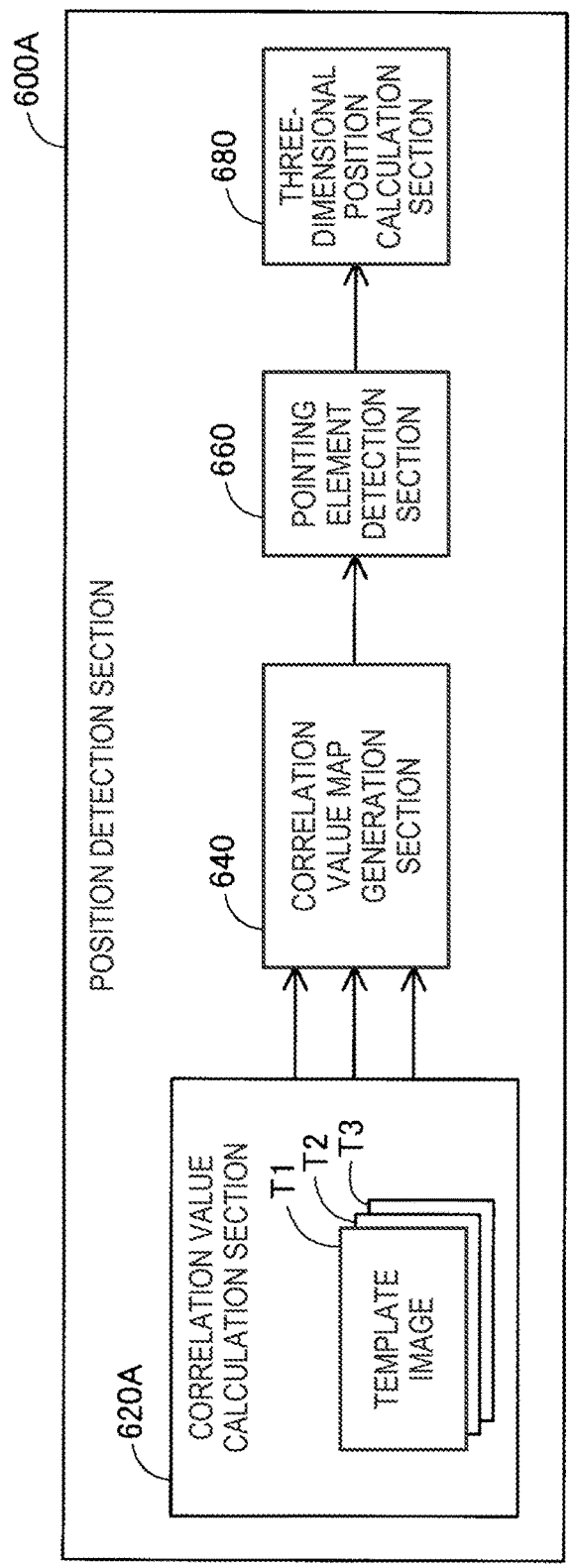
FIG. 12 is a block diagram showing a configuration of a position detection section according to a second embodiment of the invention.

FIG. 12 is a block diagram showing a configuration of a position detection section 600A according to a second embodiment of the invention. The position detection section 600A according to the second embodiment is provided with a correlation value calculation section 620A instead of the correlation value calculation section 620 in the position detection section 600 according to the first embodiment. The correlation value calculation section 620A is provided with a plurality of template images (here, three template images T1 through T3). The template images T1 through T3 according to the present embodiment are the same as the template images T21 through T23 (FIGS. 8A through 8C) according to the first embodiment, and each have the size of 13×13 pixels. In the present embodiment, the template images T1 through T3 are each generated using an image obtained by the imaging section 300 imaging the state in which an area of the screen surface SS corresponding to the small area MR2 of the taken image $M_0$ is pointed by a predetermined finger at the angle described above. In other words, the size of the finger included in the template image T corresponds to an average size of the non-light-emitting pointing element 80 included in the small area MR2 of the taken image $M_0$.

Figure 13:
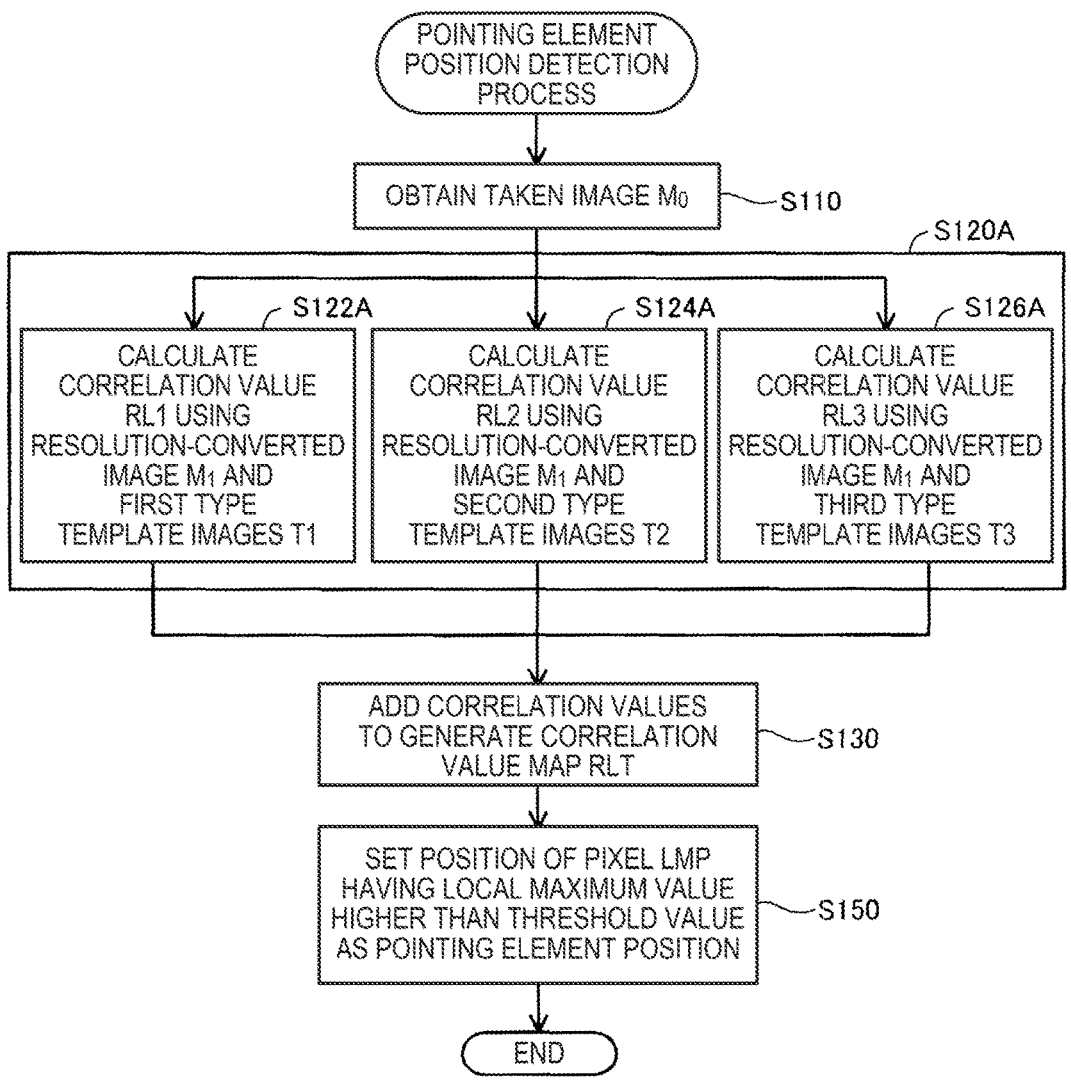
FIG. 13 is a flowchart showing a pointing element position detection process related to the non-light-emitting pointing element according to the second embodiment.
Figure 14:
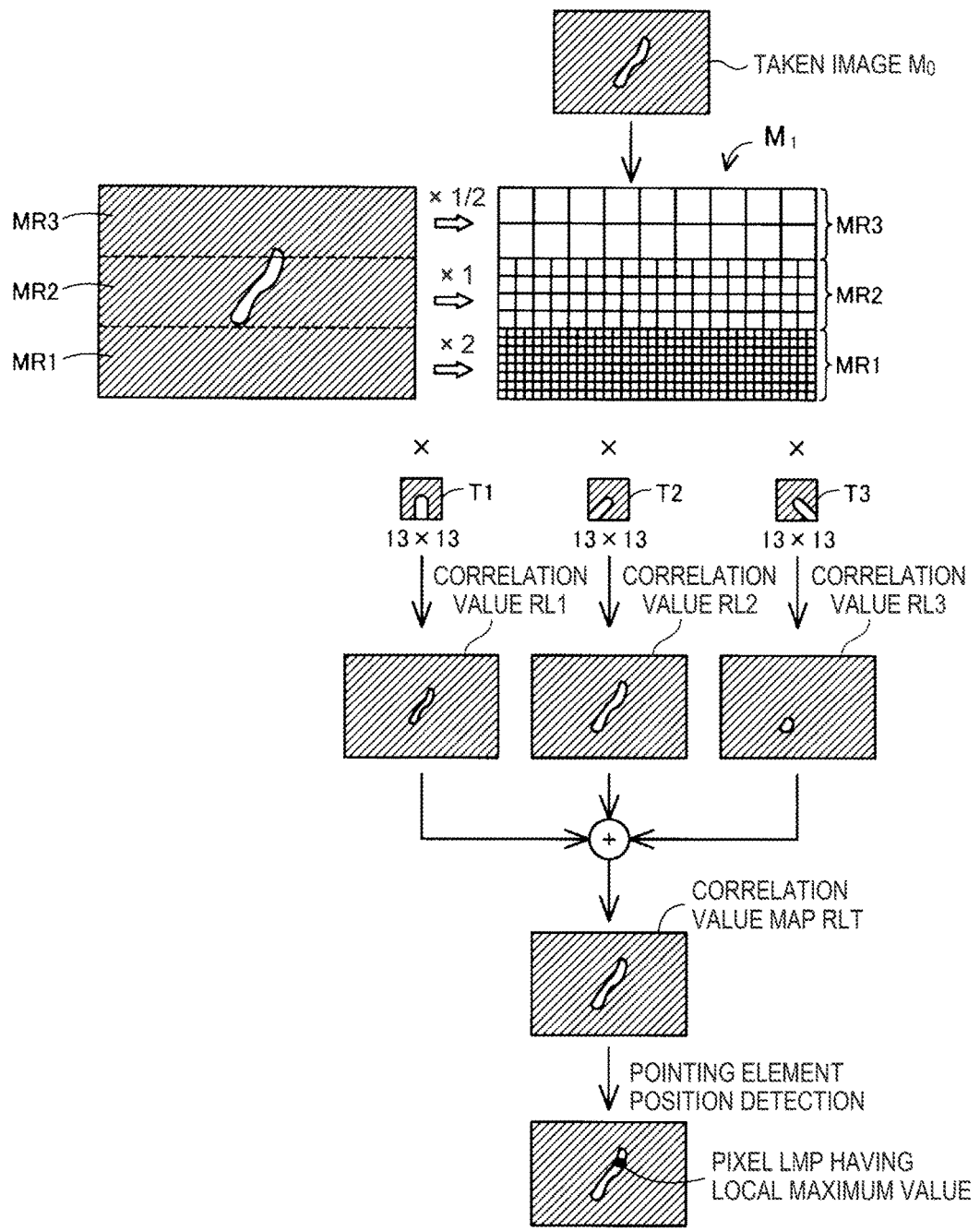
FIG. 14 is an explanatory diagram of the pointing element position detection process according to the second embodiment.

FIG. 13 is a flowchart showing the flow of a pointing element position detection process related to the non-light-emitting pointing element 80 according to the second embodiment. FIG. 14 is an explanatory diagram for explaining the pointing element position detection process according to the second embodiment.

In the second embodiment, the step S110 in the first embodiment (FIG. 10) described above is performed, and then the step S120A is performed (FIG. 13) instead of the step S120. In the step S120A, the correlation value calculation section 620A calculates the correlation values between the template images T and the taken image $M_0$ while varying the resolution for each of the small areas MR of the taken image $M_0$. Specifically, a process (the step S122A in FIG. 13) of calculating the correlation value RL1 with the first type template image T1 with respect to a resolution converted image M1 (FIG. 14), which corresponds to an image (in which no resolution conversion has not been performed on the small area MR2) obtained by converting the resolution of the small area MR1 of the taken image $M_0$ into the resolution double as high as that of the taken image $M_0$, and the converting the resolution of the small area MR3 into the resolution half as high as that of the taken image $M_0$, a process (the step S124A) of calculating the correlation value RL2 with the second type template image T2, and a process (the step S126A) of calculating the correlation value RL3 with the third type template image T3 are performed in parallel to each other.

FIGS. 15A through 15D are explanatory diagrams for explaining the calculation method of the correlation values according to the second embodiment. FIG. 15A shows template image data. In FIGS. 15A through 15D, it is assumed that the size of the template images is 3×3 pixels, and the pixel value of each of the pixels is $T_{mn}$ (m=1, 2, 3; n=1, 2, 3) in order to simplify the explanation. FIG. 15B shows the taken image data. The pixel value of the attention pixel NP(i, j) in the taken image data is denoted as $P_{i,j}$ (i, j are arbitrary integers). FIG. 15C conceptually shows the resolution conversion (double) of the taken image. In the case of calculating the correlation value between the template image and the image of the small area MR1 doubled in resolution, the correlation value with the template image T is calculated (FIG. 15D) using an area SR formed of the 3×3 pixels centered on the attention pixel NP ($=P_{i,j}$). In other words, the correlation value $SRL_2(i, j)$ of the attention pixel NP ($=P_{i,j}$) can be calculated using the formula (2) below.

$$SRL_2(i,j)=P_{i-1,j-1} \times T_{11}+P_{i-1,j} \times (T_{12}+T_{13})+P_{i,j-1} \times T_{21}+ P_{i,j} \times (T_{22}+T_{23})+P_{i+1,j-1} \times T_{31}+P_{i,j} \times (T_{32}+T_{33}) \quad (2)$$

Also in the case in which the size of the template image is 13×13 pixels, the correlation value can be calculated using a calculating formula corresponding to the formula (2) described above on the same grounds.

Figure 16:
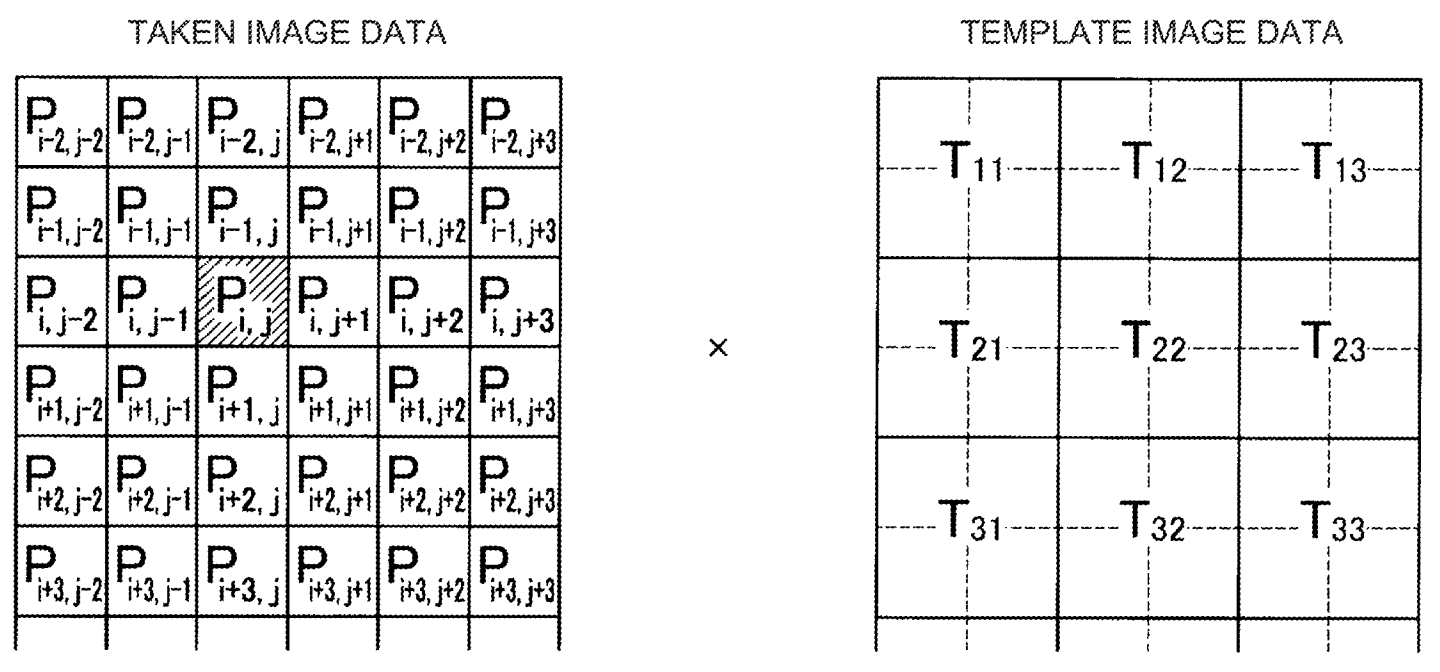

FIG. 16 is an explanatory diagram for explaining the calculation method of the correlation values according to the second embodiment. FIG. 16 conceptually shows the calculation method of the correlation values using an image (hereinafter also referred to as a half-converted image) obtained by converting the resolution of the taken image $M_0$ into the resolution half as high as that of the taken image $M_0$. In the case of calculating the correlation value with the template image T using the half-converted image, the correlation value with the template image T is calculated using 6×6 pixels centered on the attention pixel NP ($=P_{i,j}$) as shown in FIG. 16. In other words, the correlation value $SRL_{1/2}(i, j)$ of the attention pixel NP can be calculated using the formula (3) below.

$$SRL_{1/2}(i,j)=\tfrac{1}{4}\{(P_{i-2,j-2}+P_{i-2,j-1}+P_{i-1,j-2}+P_{i-1,j-1}) \times T_{11}+(P_{i-2,j}+P_{i-2,j+1}+P_{i-1,j}+P_{i-1,j+1}) \times T_{12}+ \ldots +(P_{i+2,j+2}+P_{i+2,j+3}+P_{i+3,j+2}+P_{i+3,j+3}) \times T_{33}\} \quad (3)$$

Here, as the pixel value of the pixel in the half-converted image having the half resolution, the average value of the pixel values of the four pixels not yet converted is used. In the formula (3), "¼" is multiplied in order to average the pixel values of the four pixels not yet converted.

Also in the case in which the size of the template image is 13×13 pixels, the correlation value can be calculated using a calculating formula corresponding to the formula (3) described above on the same grounds.

The correlation value map generation section 640 (FIG. 12) adds the three types of correlation values RL1 through RL3 (FIG. 14), which have been calculated by the correlation value calculation section 620A, to each other for each of the pixels of the taken image $M_0$ to thereby generate (step S130 shown in FIG. 13) the correlation value map RLT. Similarly to the above, the pointing element detection section 660 detects (step S150) the position of the pixel LMP (FIG. 14) having a local maximum value higher than the threshold value Th in the correlation value map RLT as the tip position of the pointing element.

As described above, the size of the finger included in the template image T in the present embodiment corresponds to an average size of the non-light-emitting pointing element 80 included in the small area MR2 of the taken image $M_0$. In the present embodiment, the correlation values with the template images T1 through T3 using the converted image M1 obtained by converting the resolution with the magnification suitable for each of the small areas MR obtained by the sectioning based on the local magnification M. In other words, conceptually, the image of the small area MR1 is magnified double to calculate the correlation value with the template image T, the image of the small area MR3 is shrunk half to calculate the correlation value with the template image T, and regarding the small area MR2, the correlation value with the template image T is calculated without performing the conversion of the resolution on the taken image $M_0$. Here, as is understood from the formula (2) and the formula (3) described above, the reason of the description of "conceptually" is that it is not actually required to develop the image, on which the resolution conversion has been made, in the memory, but it is sufficient to use the formula, on which the resolution conversion is reflected, as the calculation formula of the correlation values using the image value $P_{i,j}$ of the taken image data. As described above, in the present embodiment, since the correlation value is calculated using the image obtained by converting the resolution so that the size of the non-light-emitting pointing element 80 included in the small area MR1 and the small area MR2 of the taken image $M_0$ becomes approximate to the size of the finger in the template image T, higher correlation value can be obtained using the template images T1 through T3 having the same size. As a result, the detection accuracy of the non-light-emitting pointing element 80 can be improved.

D. Position Detection Section According to Third Embodiment (Plurality of Correlation Values are Added with Weight Corresponding to Local Magnification)

A correlation value calculation section of an interactive projector according to the third embodiment is provided with the three template images T1 through T3 similarly to the correlation value calculation section 620A according to the second embodiment. The template images T1 through T3 according to the present embodiment are images having similar figures to those of the template images according to the second embodiment, and each have the size of 15×15 pixels. In the present embodiment, the template images T1 through T3 are each generated using an image obtained by the imaging section 300 imaging the state in which an area of the screen surface SS corresponding to the small area MR3 of the taken image $M_0$ is pointed by a predetermined finger. In other words, the size of the finger included in the template image T corresponds to an average size of the non-light-emitting pointing element 80 included in the small area MR3 of the taken image $M_0$.

Figure 17:
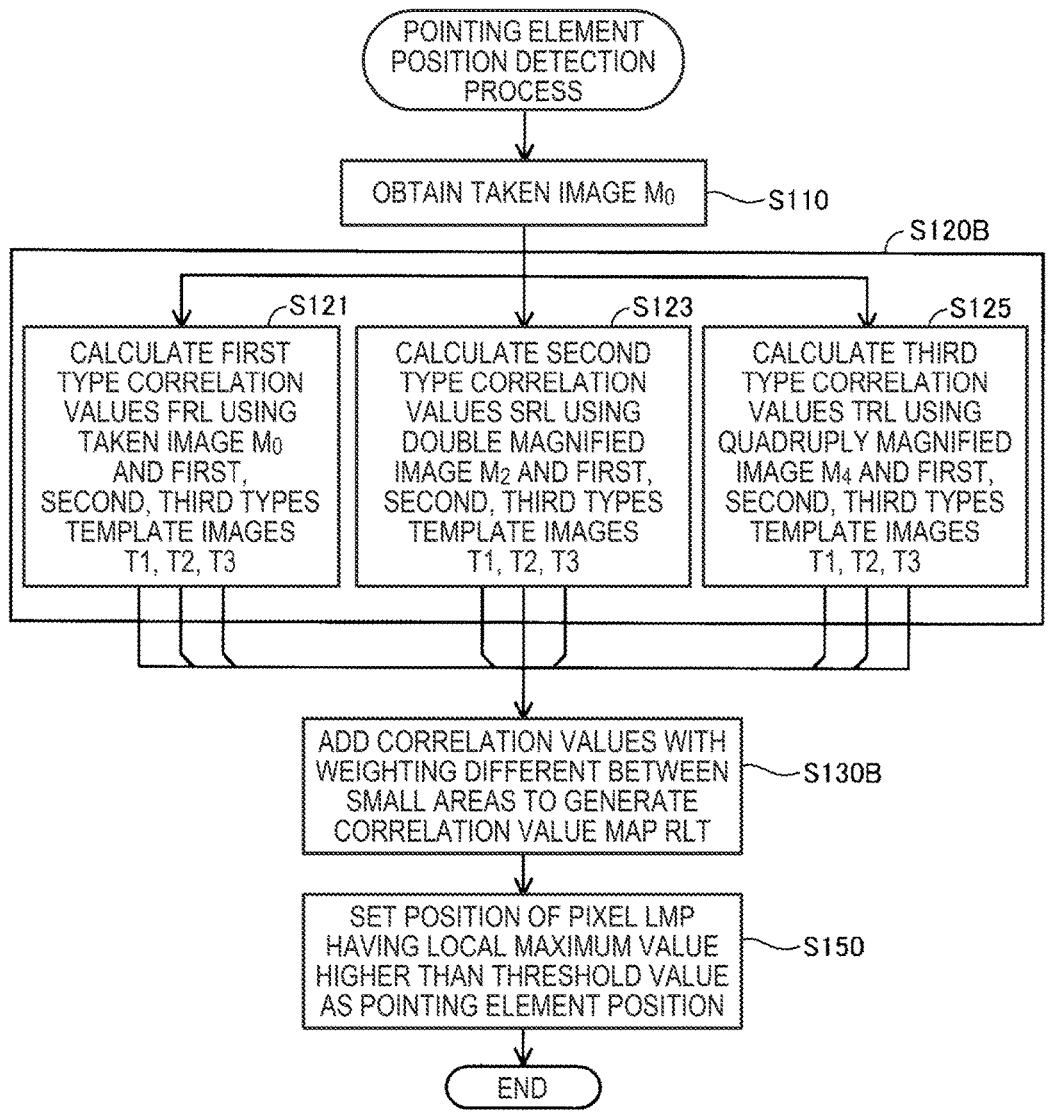
FIG. 17 is a flowchart showing a pointing element position detection process related to the non-light-emitting pointing element according to a third embodiment of the invention.
Figure 18:
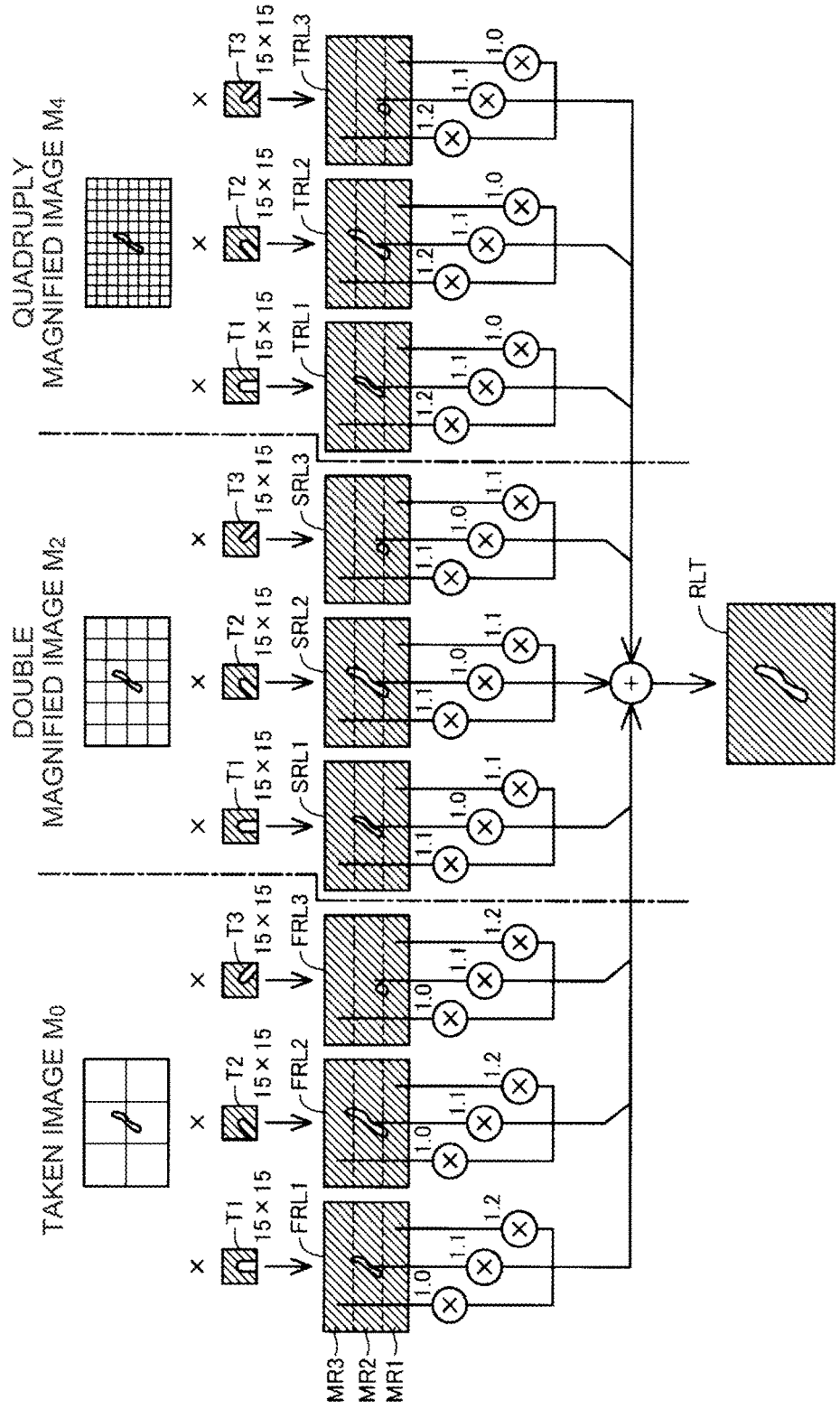
FIG. 18 is an explanatory diagram of generation of a correlation value map according to the third embodiment.

FIG. 17 is a flowchart showing the flow of a pointing element position detection process related to the non-light-emitting pointing element 80 according to the third embodiment. FIG. 18 is an explanatory diagram for explaining generation of a correlation value map according to the third embodiment.

In the third embodiment, the step S110 in the second embodiment (FIG. 13) described above is performed, and then the step S120B is performed (FIG. 17) instead of the step S120A. In the third embodiment, an image increased in resolution is also used in the process (step S120B in FIG. 17) of calculating the correlation values between the template images T and the taken image $M_0$. Specifically, in the step S120B, the correlation value calculation section performs the process (step S121) of calculating a first type correlation value FRL between each of the template images T and the taken image $M_0$ using the taken image $M_0$ and the plurality of template images T1 through T3, a process (step S123) of calculating a second type correlation value SRL between each of the template images T and the taken image $M_0$ using a double magnified image M2 (FIG. 18) with the resolution double as high as that of the taken image $M_0$ and the plurality of template images T1 through T3, and a process (step S125) of calculating a third type correlation value TRL between each of the template images T and the taken image $M_0$ using a quadruply magnified image M4 (FIG. 18) with the resolution four times as high as that of the taken image $M_0$ and the plurality of template images T1 through T3 in parallel to each other. In detail, in the step S121, the correlation value calculation section calculates three first type correlation values FRL1 through FRL3 corresponding respectively to the three template images T1 through T3. Similarly, in the step S123, the correlation value calculation section calculates three second type correlation values SRL1 through SRL3 corresponding respectively to the three template images T1 through T3. Similarly, in the step S125, the correlation value calculation section calculates three third type correlation values TRL1 through TRL3 corresponding respectively to the three template images T1 through T3. In other words, in the present embodiment, in the process (step S120B) of calculating the correlation values between the template images T and the taken image $M_0$, the nine types of correlation values (FRL1 through FRL3, SRL1 through SRL3, and TRL1 through TRL3) are calculated. The double magnified image M2 and the quadruply magnified image M4 in the present embodiment each correspond to a resolution-converted image in the appended claims. The correlation values using the double magnified image M2 and the quadruply magnified image M4 can be calculated using the calculation formula corresponding to the formula (2) described above on the similar grounds to the second embodiment.

The correlation value map generation section adds the nine types of correlation values FRL1 through FRL3, SRL1 through SRL3, and TRL1 through TRL3 (FIG. 18), which have been calculated by the correlation value calculation section, to each other for each of the pixels of the taken image $M_0$ to thereby generate the correlation value map RLT. On this occasion, the addition is performed (step S130B shown in FIG. 17) with the weight different between the small areas MR. As shown in FIG. 18 in detail, regarding the first type correlation values FRL, weighting of 1.2 is performed in the small area MR1, weighting of 1.1 is performed in the small area MR2, and weighting of 1.0 is performed in the small area MR3. In the case in which, for example, the non-light-emitting pointing element 80 (the finger) is located in the small area MR3, since the size of the non-light-emitting pointing element 80 included in the taken image $M_0$ is approximate to that of the template images T, high correlation values can be obtained. In contrast, in the case in which the non-light-emitting pointing element 80 (the finger) is located in either of the small areas MR1, MR2, since the size of the non-light-emitting pointing element 80 included in the taken image $M_0$ is relatively small, and high correlation values cannot be obtained, it is difficult for the non-light-emitting pointing element 80 to be detected. Therefore, regarding the small areas MR1, MR2, it is arranged to make it easy to detect the non-light-emitting pointing element 80 even in the case in which the non-light-emitting pointing element 80 is located in either of the small areas MR1, MR2 by performing the addition with weighting higher than that in the small area MR3. In other words, the lower the correlation value FRL in the area is, the higher the weighting in the area is set.

Regarding the second type correlation values SRL, since high correlation values SRL can be obtained in the case in which the non-light-emitting pointing element 80 is located in the small area MR2, weighting is set to 1.0 in the small area MR2, and higher weighting of 1.1 is performed in the small areas MR1, MR3. Regarding the third type correlation values TRL, since high correlation values TRL can be obtained in the case in which the non-light-emitting pointing element 80 is located in the small area MR1, weighting of 1.0 is performed in the small area MR1, weighting of 1.1 is performed in the small area MR2, and weighting of 1.2 is performed in the small area MR3. It should be noted that weighting is not limited to the present embodiment, but can arbitrarily be set to a variety of values except 0. It is preferable to set weighting so that the lower the correlation value in the area is, the higher the weighting in that area is set.

Similarly to the above, the pointing element detection section 660 detects (step S150) the position of the pixel LMP having a local maximum value higher than the threshold value Th in the correlation value map RLT as the tip position of the pointing element.

According to the third embodiment, the correlation values are calculated using the images obtained by increasing the resolution of the taken image, then all of the correlation values obtained using the images with a plurality of resolutions are added to each other to thereby generate the correlation value map RLT. As described above, the size of the non-light-emitting pointing element 80 included in the taken image $M_0$ differs in accordance with the local magnification M. In the present embodiment, the correlation values with the template images T are calculated with the resolution of the taken image increased with the image conceptually magnified. In the present embodiment, the size of the finger included in the template images T is approximate to the average size of the non-light-emitting pointing element 80 included in the small area MR3 of the taken image $M_0$. Therefore, in view of the correlation with the template images T, in the taken image $M_0$, the high correlation values can be obtained in the small area MR3, in the double magnified image M2, the high correlation values can be obtained in the small area MR2, and in the quadruply magnified image M4, the high correlation values can be obtained in the small area MR1. In the present embodiment, when generating the correlation value map, the weighting for addition in the small area MR where the variety of types of correlation values FRL, SRL, and TRL are relatively low is set to a higher value. Therefore, the accuracy of the correlation value map RLT is improved, and as a result, the detection accuracy of the non-light-emitting pointing element 80 can be improved.

E. Position Detection Section According to Fourth Embodiment (Number of Pixels in High Correlation Value Area is Varied in Accordance with Local Magnification)

Figure 19:
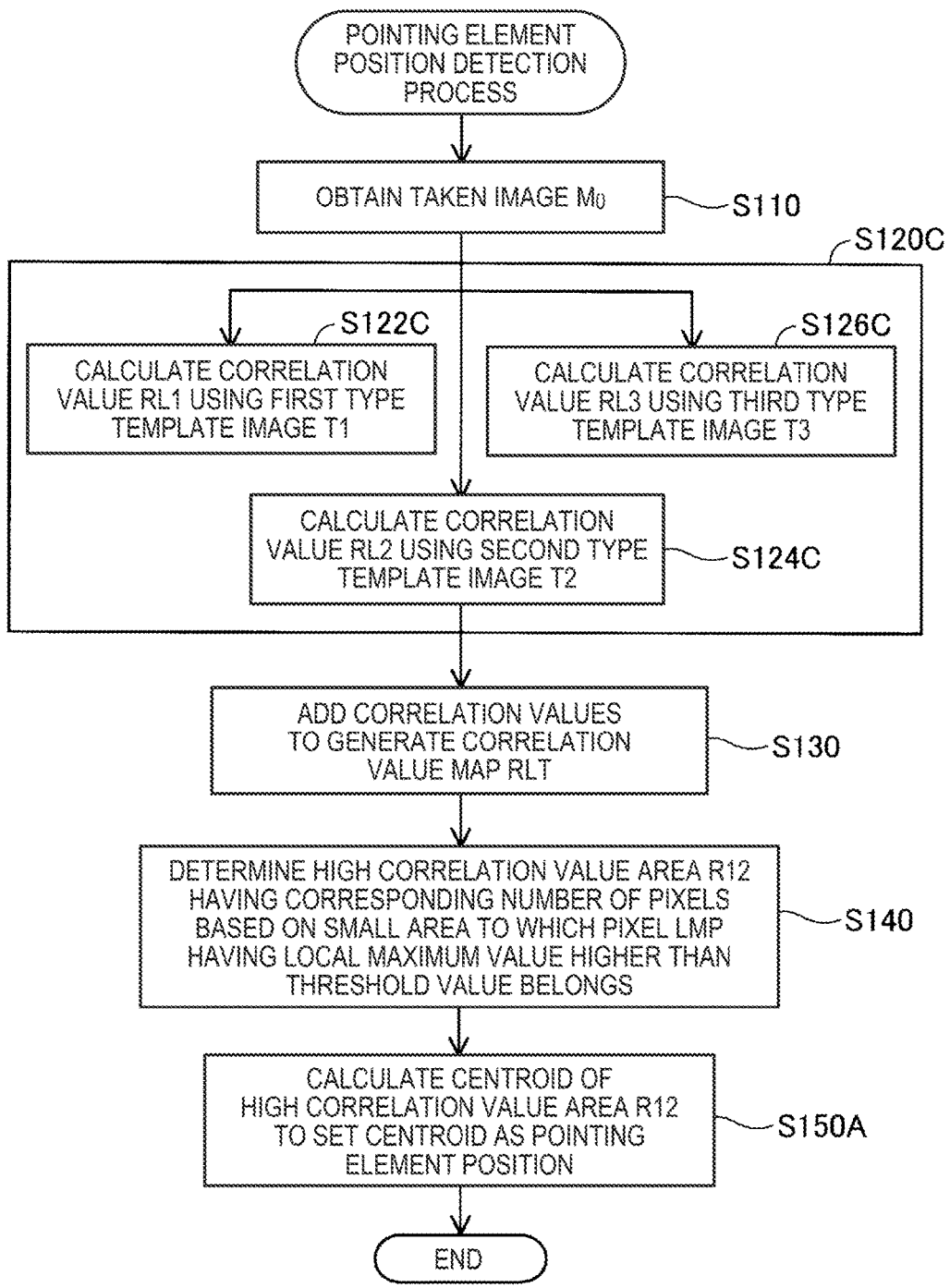
FIG. 19 is a flowchart showing a pointing element position detection process related to the non-light-emitting pointing element according to a fourth embodiment of the invention.
Figures 20A, 20B:
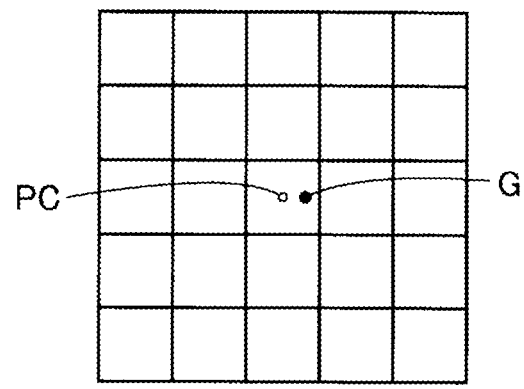
FIGS. 20A and 20B are explanatory diagrams of a determination method of a pointing element position according to the fourth embodiment.

FIG. 19 is a flowchart showing the flow of a pointing element position detection process related to the non-light-emitting pointing element 80 according to the fourth embodiment. FIGS. 20A and 20B are explanatory diagrams for explaining a determination method of the pointing element position according to the fourth embodiment.

In the fourth embodiment, the step S110 in the second embodiment (FIG. 13) described above is performed, and then the step S120C is performed (FIG. 19) instead of the step S120A. In the fourth embodiment, in the step S120C, the correlation values RL1 through RL3 between the taken image $M_0$ and the template images T1 through T3 are calculated (steps S122C, S124C, and S126C shown in FIG. 19). Subsequently, the step S130 in the second embodiment (FIG. 13) is performed, and then the steps S140, S150A are performed (FIG. 19) instead of the step S150.

In the present embodiment, unlike the first through third embodiments, the centroid of a predetermined high correlation value area R12 higher than the threshold value Th is calculated with the accuracy corresponding to a value smaller than one pixel in the correlation value map RLT, and then the centroid is set as the position (the pointing element position) of the tip portion 81 of the non-light-emitting pointing element 80. Specifically, as described later in detail, the pointing element detection section determines (step S140 shown in FIG. 19) the high correlation value area having a number of pixels corresponding to the small area MR to which the pixel LMP having a local maximum value higher than the threshold Th belongs to in the correlation value map RLT. In FIG. 20A, the pixel LMP is provided with hatching, and the high correlation value area R12 formed of 5×5 pixels is shown as an example. Further, the centroid position G of the correlation values of the pixels in the high correlation value area R12 is calculated with the accuracy corresponding to the value smaller than one pixel, and the centroid position G is set (step S150A shown in FIG. 19) as the position (the pointing element position) of the tip portion 81 of the non-light-emitting pointing element 80. Here, the centroid position G ($X_G$, $Y_G$) is the position obtained taking the correlation values of the pixels in the high correlation value area R12 into consideration, and is calculated using the formulas (4a), (4b) described below.

$$X_G = \Sigma \alpha i X i / \Sigma \alpha i \qquad (4a)$$

$$Y_G = \Sigma \alpha i Y i / \Sigma \alpha i \qquad (4b)$$

Here, αi denotes the correlation value of each of the pixels in the high correlation value area R12, Xi, Yi denotes the X coordinate and the Y coordinate of each of the pixels.

As shown in FIG. 20A, since the pixel values in the high correlation value area R12 are not symmetric about the center pixel (the pixel LMP provided with the hatching in FIG. 20A) of the high correlation value area R12, the centroid position G of the high correlation value area R12 becomes different in coordinate from the center position PC in the correlation value map RLT as shown in FIG. 20B.

Figure 21A:
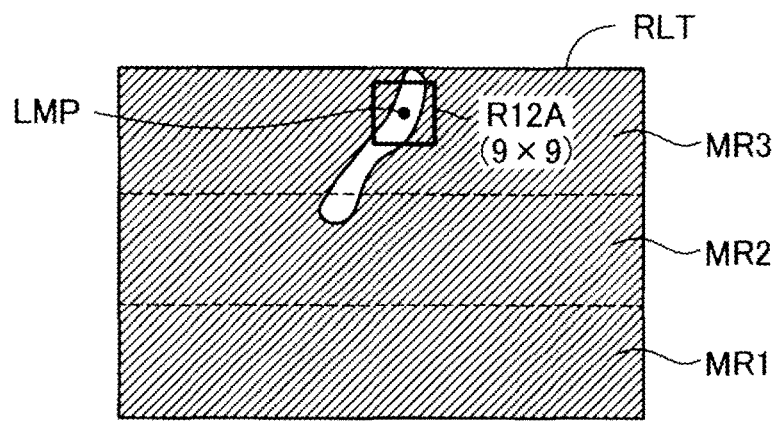
FIGS. 21A through 21C are explanatory diagrams of a high correlation value area in the fourth embodiment.
Figure 21B:
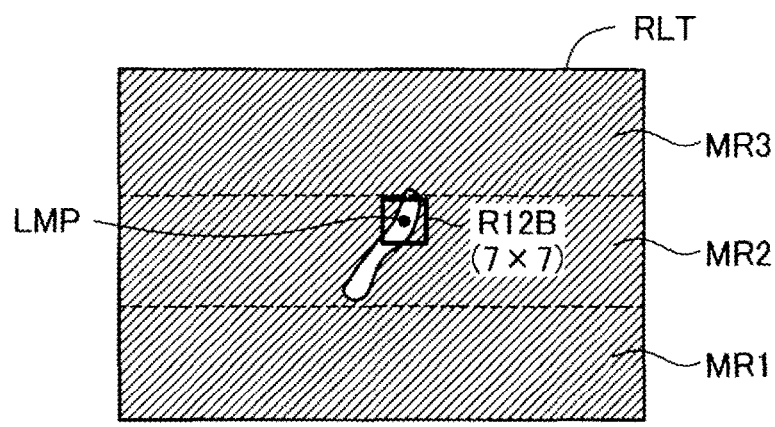
Figure 21C:
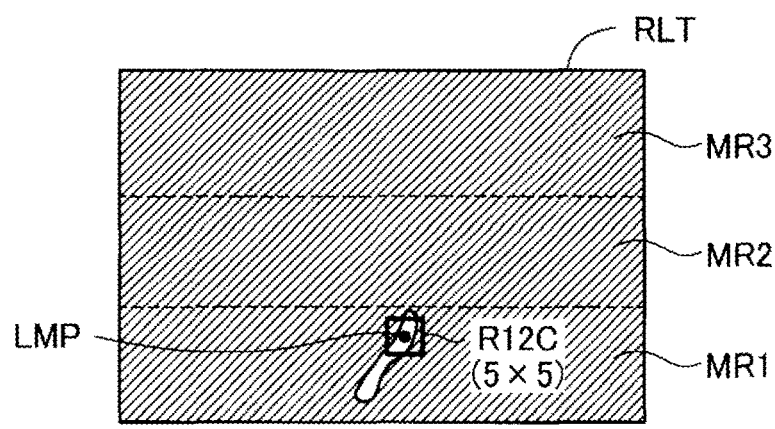

FIGS. 21A through 21C are explanatory diagrams for explaining the high correlation value area R12 according to the fourth embodiment. In the present embodiment, as described above, the pointing element detection section detects the local maximum value pixel LMP having the local maximum value higher than the threshold value Th in the correlation value map RLT, and then determines (step S140 shown in FIG. 19) the number of pixels in the high correlation value area R12 used for the calculation of the centroid in the step S150A based on the small area MR to which the local maximum value pixel LMP belongs. FIG. 21A shows an example in which the local maximum value pixel LMP belongs to the small area MR3 in the correlation value map RLT. In this case, the high correlation value area R12A is determined to be 9×9 pixels centered on the local maximum value pixel LMP. FIG. 21B shows an example in which the local maximum value pixel LMP belongs to the small area MR2 in the correlation value map RLT. In this case, the high correlation value area R12A is determined to be 7×7 pixels centered on the local maximum value pixel LMP. FIG. 21C shows an example in which the local maximum value pixel LMP belongs to the small area MR1 in the correlation value map RLT. In this case, the high correlation value area R12A is determined to be 5×5 pixels centered on the local maximum value pixel LMP.

As described above, the size of the non-light-emitting pointing element 80 included in the taken image $M_O$ differs in accordance with the local magnification M. As a result, the size of the area in which the correlation value is higher than the threshold value Th in the correlation value map RLT is different. For example, in the small area MR3, the local magnification M is higher compared to the small areas MR1, MR2, and the area in which the correlation values are higher than the threshold value Th in the correlation value map RLT is larger compared to the small areas MR1, MR2. Therefore, by setting the number of pixels in the high correlation value area R12 to be greater than those in the small areas MR1, MR2, the calculation accuracy of the centroid position can be improved. It should be noted that in the small area MR1 having a relatively small local magnification M, by reducing the number of pixels of the high correlation value area R12C, the processing time of the centroid calculation process can be reduced.

F. Position Detection Section According to Fifth Embodiment (Cutoff Frequency is Varied in Accordance with Local Magnification)

Figure 22:
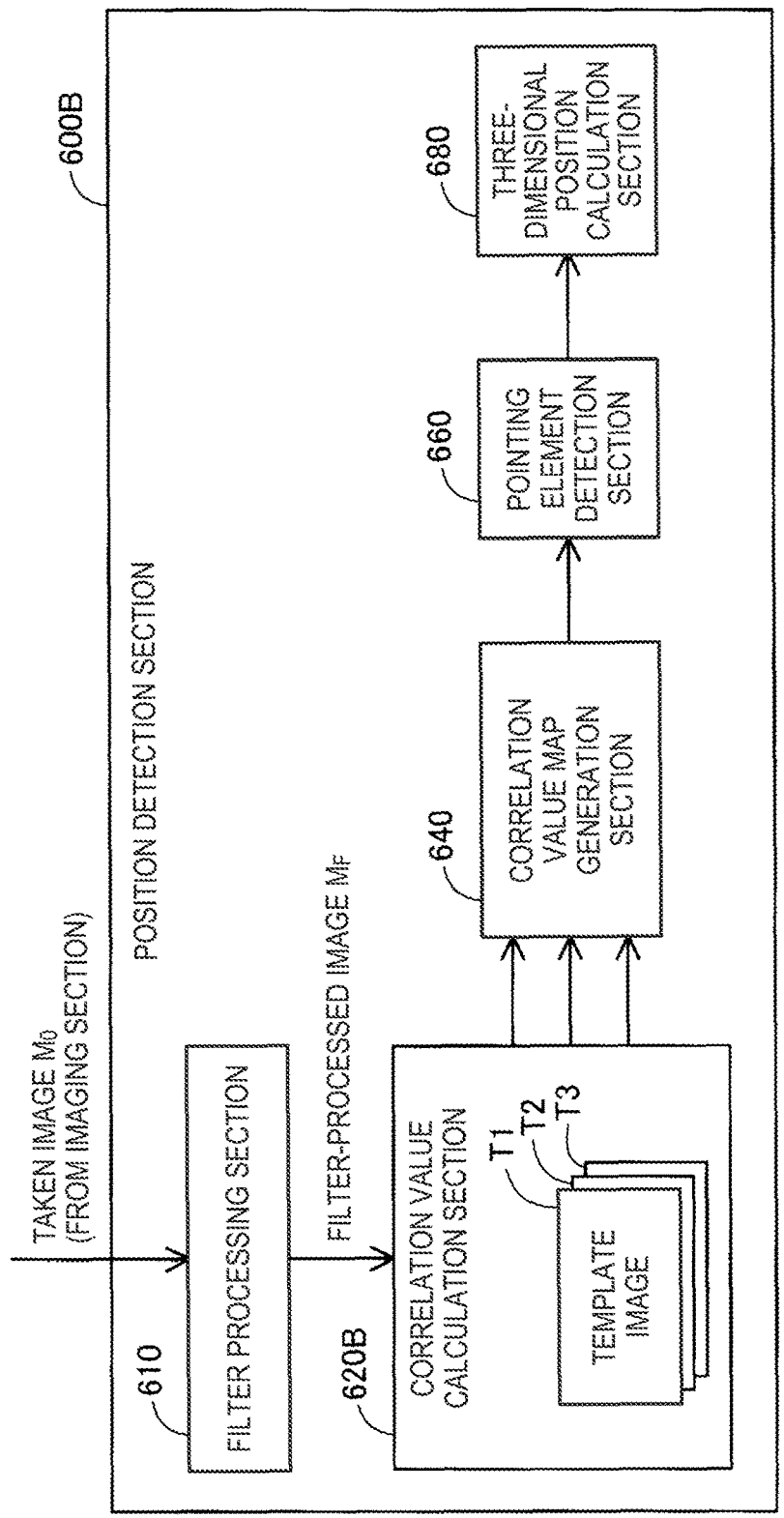
FIG. 22 is a block diagram showing a schematic configuration of a position detection section according to a fifth embodiment of the invention.

FIG. 22 is a block diagram showing a schematic configuration of a position detection section 600B according to a fifth embodiment of the invention. The position detection section 600B according to the present embodiment is provided with a filter processing section 610 in addition to the configuration of the position detection section 600A (FIG. 12) according to the second embodiment. The filter processing section 610 performs filter processing using a low-pass filter on the taken image $M_O$, which is input to the position detection section 600B by the imaging section 300, to thereby generate a filter-processed image $M_F$. The filter processing section 610 uses the low-pass filters different in cutoff frequency from each other between the small areas MR of the taken image $M_O$. Specifically, the cutoff frequencies of the low-pass filters used in the respective small areas MR fulfill the relationship of (small area MR1)<(small area MR2)<(small area MR3). In other words, the smaller the local magnification M is, the lower the cutoff frequency of the low-pass filter is set. Since the size of the non-light-emitting pointing element 80 included in the small area MR1 with the low local magnification M is small, by lowering the cutoff frequency of the low-pass filter, the contour of the non-light-emitting pointing element 80 blurs to increase the size of the non-light-emitting pointing element, and thus the detection accuracy of the non-light-emitting pointing element 80 can be improved. In contrast, since the size of the non-light-emitting pointing element 80 included in the small area MR3 high in local magnification M is sufficiently large, by raising the cutoff frequency of the low-pass filter to decrease the blur level, the detection accuracy is improved. The correlation value calculation section 620 calculates the correlation values using the filter-processed image $M_F$ similarly to the second embodiment.

G. Position Detection Section According to Sixth Embodiment (Template Images are Changed in Accordance with Position in Taken Image)

Figure 23:
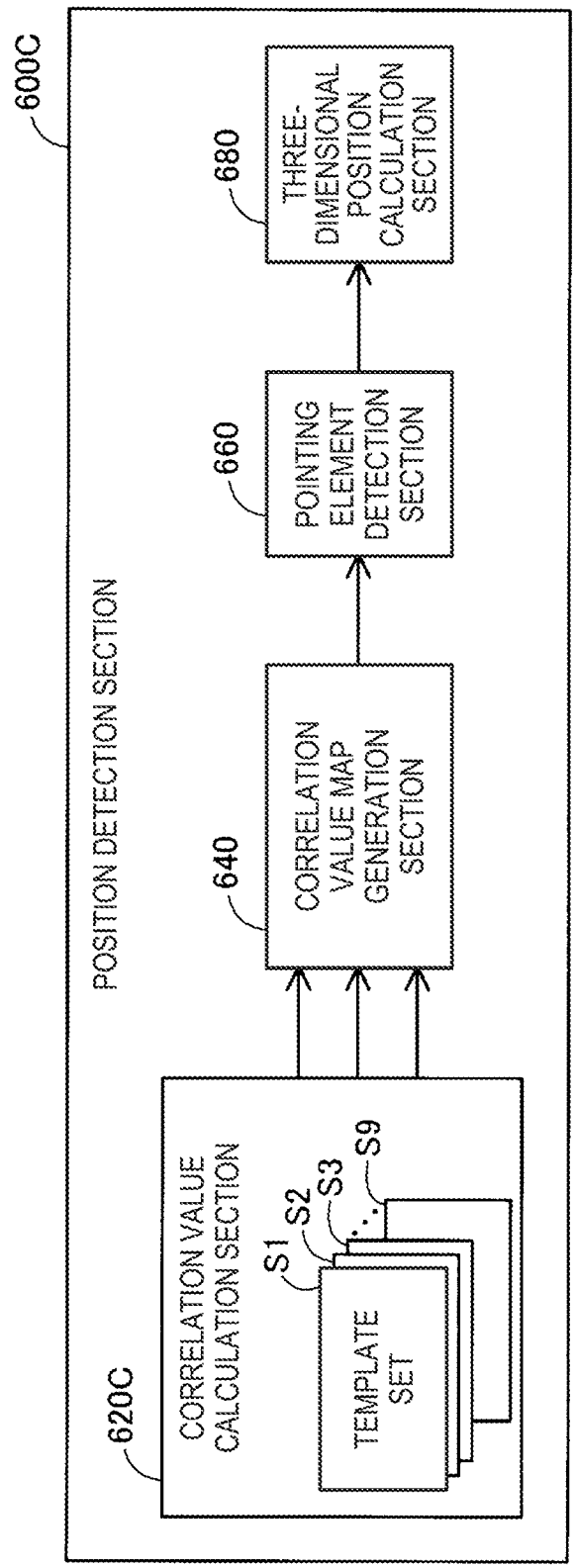
FIG. 23 is a block diagram showing a configuration of a position detection section according to a sixth embodiment of the invention.

FIG. 23 is a block diagram showing a configuration of a position detection section 600C according to a sixth embodiment of the invention. The position detection section 600C according to the sixth embodiment is provided with a correlation value calculation section 620C instead of the correlation value calculation section 620 in the position detection section 600 according to the first embodiment. The correlation value calculation section 620C is provided with a plurality of template sets (here, nine template sets S1 through S9). Each of the template sets is provided with a plurality of types of template images (here, two types of template images T1, T2).

Figure 24:
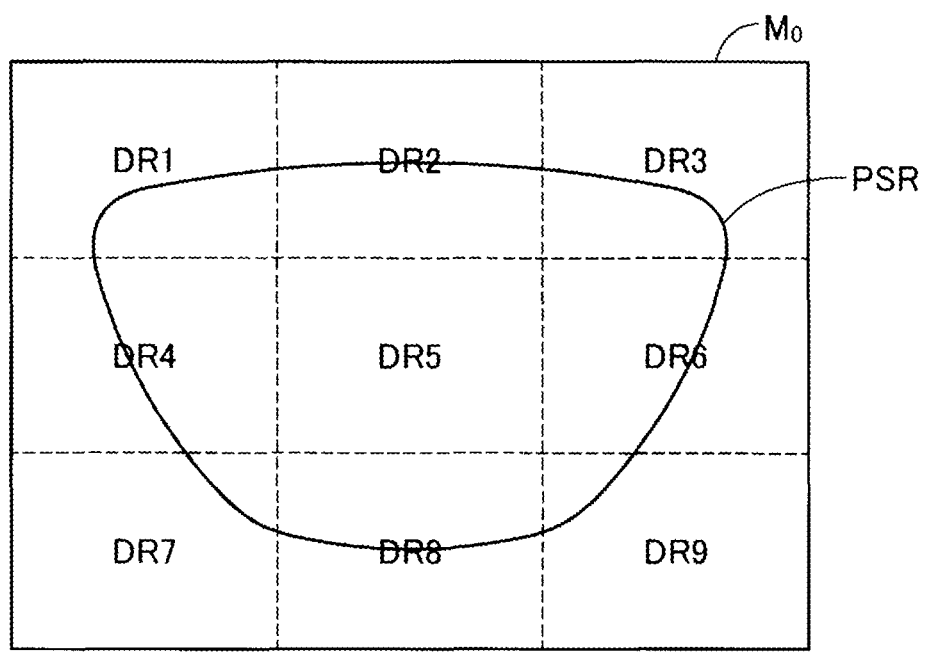
FIG. 24 is an explanatory diagram of a small area in the sixth embodiment.

FIG. 24 is an explanatory diagram for explaining the small areas according to the sixth embodiment. In the present embodiment, the small areas DR are determined based on the position (the pixel coordinate) in the taken image $M_O$ irrespective of the local magnification M. The taken image $M_O$ is sectioned into nine equal parts, and is provided with the nine small areas DR1 through DR9. The number of the small areas DR is not limited to that of the present embodiment, but can be equal to or larger than 10, or in a range of 2 through 8.

Figure 25:
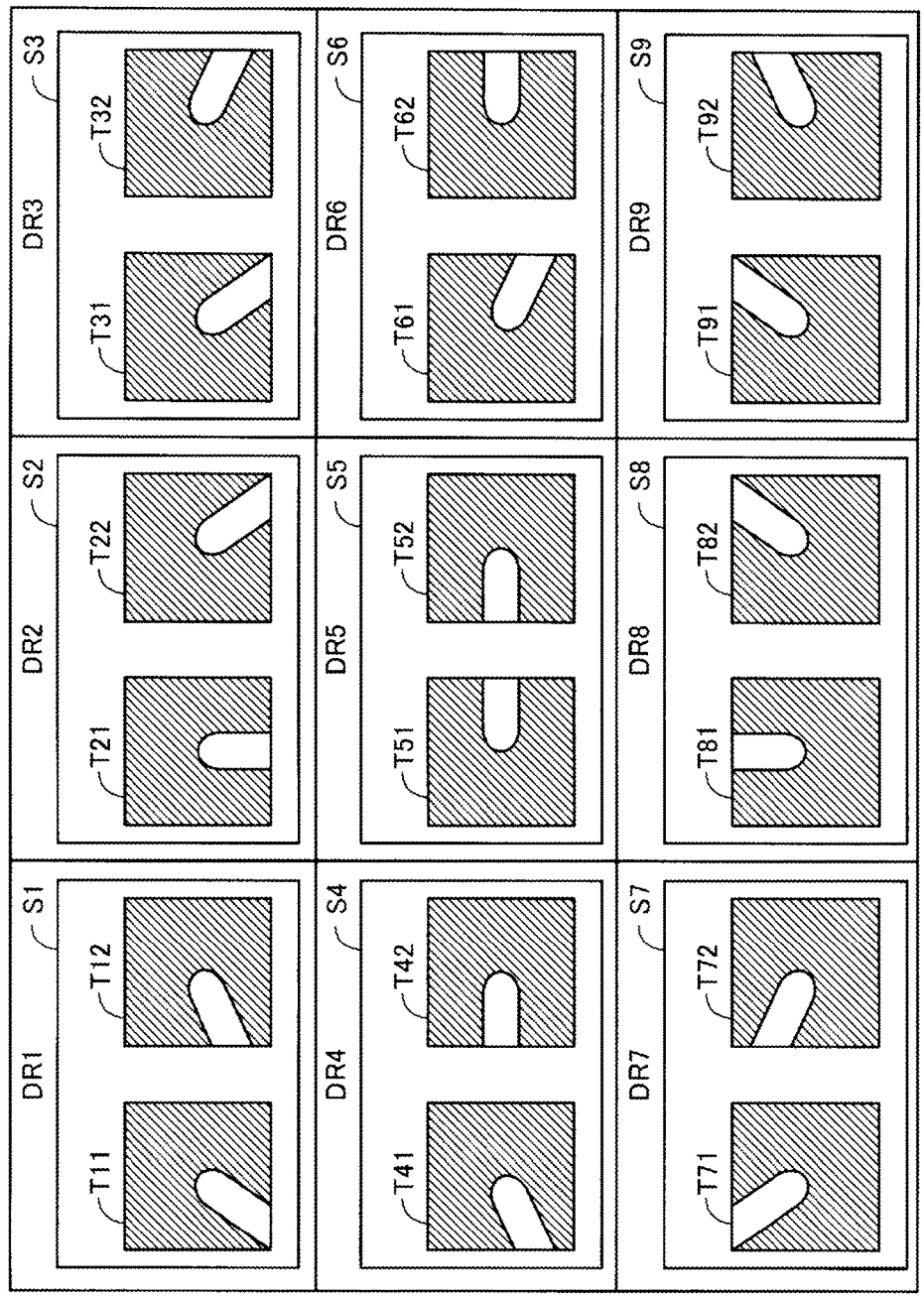
FIG. 25 is an explanatory diagram of a correspondence between small areas and template sets.

FIG. 25 is an explanatory diagram for explaining the correspondence between each of the small areas DR1 through DR9 (FIG. 24) and the template sets S1 through S9 (FIG. 23). FIG. 25 shows the template sets S1 through S9 used when calculating the correlation values of the small areas DR shown in FIG. 24. The template set S1 is used to the small area DR1. Similarly, to the small areas DR2 through DR9, the corresponding template sets S2 through S9 are respectively used. Each of the template sets S is provided with two types of template images T different from each other. In the present embodiment, the $n^{th}$ (n=1, 2) type template T of the $m^{th}$ (m is an integer in a range of 1 through 9) template set Sm is referred to as the template Tmn. In each of the template sets S, shapes (directions) high in possibility are selected as the shapes (the directions) of the non-light-emitting pointing element 80 included in each of the small areas of the taken image $M_O$. For example, since the small areas DR1, DR4, and DR7 located on the left side of the drawing of the taken image $M_O$ correspond to the left side of the screen surface SS, and are high in possibility that the pointer (a person having the non-light-emitting pointing element 80) stands on the left side of the screen surface SS, and performs pointing to the projected screen PS, the template sets S1, S4, and S7 corresponding respectively to the small areas DR1, DR4, and DR7 are provided with the template image T using the image of the finger performing pointing from the left side. Based on the similar grounds, the template sets S3, S6, and S9 corresponding respectively to the small areas DR3, DR6, and DR9 located on the right side of the drawing of the taken image $M_O$ are provided with the template image T using the image of the finger performing pointing from the right side. Regarding the small areas DR2, DR5, and DR8 located in the central portion of the taken image $M_O$, since there is a possibility that the pointer stands on either of the right side and left side of the screen surface SS, the combination taking this possibility into consideration is adopted in the template sets S2, S5, and S8 corresponding respectively to the small areas DR2, DR5, and DR8. Regarding the template images T provided to any two template sets S, one of the two template images T provided to one template set S can be the same as one of the two template images T provided to the other template set S although the combination of the template images T is different between the template sets S. For example, the same image is used as the template image T22 and the template image T31. Similarly, the same image is used as the template image T42 and the template image T52, the same image is used as the template image T51 and the template image T62, and the same image is used as the template image T82 and the template image T91. It should be noted that all of the template images T provided to the template sets S in the present embodiment have the same size (13×13 pixels).

In the present embodiment, the correlation value calculation section 620C (FIG. 23) calculates the correlation value RL1 corresponding to the first type template image T1 and the correlation value RL2 corresponding to the second type template image T2 using the template sets S (FIG. 25) different between the small areas DR (FIG. 24) of the taken image $M_0$, and then adds the correlation value RL1 and the correlation value RL2 to each other for each of the pixels of the taken image $M_0$ to generate the correlation value map RLT similarly to the first embodiment.

In the present embodiment, the taken image $M_0$ is sectioned into the plurality of small areas DR based on the position (pixel coordinate) of the taken image $M_0$, and the correlation values are calculated using the template sets S different between the small areas DR. As described above, since the template images T provided to the template sets S are determined in accordance with the possible directions of the non-light-emitting pointing element 80 in the small areas DR, high correlation values can be obtained. As a result, the detection accuracy of the non-light-emitting pointing element 80 can be improved.

H. Modified Examples

It should be noted that the invention is not limited to the specific examples and the embodiments described above, but can be implemented as various forms within the scope or the spirit of the invention, and the following modifications, for example, are also possible.

Modified Example 1

Although in the embodiments described above, the interactive projector capable of using both of the light-emitting pointing element 70 and the non-light-emitting pointing element 80 as the pointing element is described as an example, it is also possible to adopt the configuration in which only the non-light-emitting pointing element 80 is available.

Modified Example 2

Although in the embodiments described above, it is assumed that the imaging section 300 includes the two cameras 310, 320, it is also possible to adopt the configuration of providing one camera to the imaging section 300, or the configuration of providing three or more cameras to the imaging section 300. In the latter case, the three-dimensional coordinate (X, Y, Z) is determined based on m (m is an integer equal to or greater than three) images taken by the m cameras. For example, it is possible to obtain the three-dimensional coordinates using $_mC_2$ combinations obtained by arbitrarily selecting two images out of the m images, and then obtain the final three-dimensional coordinate using the average value of the three-dimensional coordinates. By adopting this configuration, the detection accuracy of the three-dimensional coordinate can further be improved.

Modified Example 3

Although in the embodiments described above, it is assumed that the interactive projection system 900 can act in the whiteboard mode and the PC interactive mode, the system can also be configured so as to act in either one of the modes. Further, it is also possible for the interactive projection system 900 to be configured so as to act only in other modes than these two modes, or further to be configured so as to be able to act in a plurality of modes including these two modes.

Modified Example 4

Although in the embodiments described above it is assumed that the irradiating detection light IDL, the reflected detection light RDL, the device signal light ASL, and the pointing element signal light PSL shown in FIG. 3 are all the near infrared light, it is also possible to assume that some or all of these types of light are light other than the near infrared light.

Modified Example 5

Although in the embodiments described above, there is described the example of adding the correlation values RL corresponding to the respective template images T in the case of generating the correlation value map RLT using the plurality of template images T, it is also possible to adopt a configuration of, for example, selecting the correlation value R corresponding to the template image T exhibiting the highest correlation.

Modified Example 6

In the pointing element detection section 660 according to the embodiments described above, it is also possible to adopt a configuration of performing binarization based on a predetermined threshold value on the correlation value map RLT to thereby detect the non-light-emitting pointing element 80. On this occasion, the threshold values different between the small areas can also be used. For example, it is also possible to set the threshold value so that the shorter the distance between the projected screen PS and the imaging section 300 is, the higher the threshold value is. Specifically, the threshold values are set so as to fulfill the relationship of MR3>MR2>MR1. As described above, the shorter the distance between the non-light-emitting pointing element 80 and the imaging section 300 is, the brighter the non-light-emitting pointing element 80 in the taken image $M_0$ is (the greater the pixel value is). In other words, in the case in which the distance between the non-light-emitting pointing element 80 and the imaging section 300 is long, the non-light-emitting pointing element 80 in the taken image $M_0$ is dark (small in pixel value), and therefore, by setting the threshold value to a low value, the non-light-emitting pointing element 80 can appropriately be detected. In contrast, in the small area in which the distance between the non-light-emitting pointing element 80 and the imaging section 300 is short, if the threshold value is low, the area detected by the binarization is large, and the detection accuracy is degraded. Therefore, by setting the threshold value to a high value, the non-light-emitting pointing element 80 can appropriately be detected. As described above, by varying the threshold value in accordance with the small areas MR, the non-light-emitting pointing element 80 can appropriately be detected.

Modified Example 7

It is also possible to arbitrarily combine any of the embodiments described above. For example, it is possible to combine the fourth embodiment with each of the first through third, and sixth embodiments, and it is possible to further combine the fifth embodiment. Further, for example, in the first embodiment, it is also possible to change both of the size of the template image T and the type (the direction of the finger) of the template image T between the small areas MR. According also to this configuration, the detection accuracy of the non-light-emitting pointing element 80 can be improved.

Modified Example 8

In the embodiments described above, there are described the example of sectioning the small areas MR based on the local magnification M, and the example of sectioning the small areas DR based on the position (the pixel coordinate) in the taken image $M_0$, the invention is not limited to the embodiments described above. For example, the small areas can also be sectioned based on the distance between the cameras 310, 320 and the screen surface SS.

Modified Example 9

Although in the above description of the embodiments, there is described the example of sectioning the small area DR based on the local magnification M and the position (the pixel coordinate) of the taken image $M_0$, and using the parameter for the template matching different between the small areas MR, it is also possible to adopt a configuration of determining the parameter based on the local magnification of each of the small areas sectioned by a predetermined sectioning method. For example, as shown in the description of the sixth embodiment, it is also possible to section the taken image $M_0$ into nine equal parts to determine the parameter in accordance with the local magnification M in each of the small areas DR1 through DR9.

Modified Example 10

Although in the above description of the embodiments, there is described the example of detecting the non-light-emitting pointing element 80 using the template matching, the method of detecting the non-light-emitting pointing element 80 is not limited to those of the embodiments described above. It is also possible to detect the non-light-emitting pointing element 80 using, for example, a feature extraction process or an edge detection process. In the case of detecting the non-light-emitting pointing element 80 using the feature extraction process or the edge detection process, it is possible to differ the resolution conversion magnification of the target image (the taken image) used when performing the pointing element detection between the small areas. Further, it is also possible to detect the light-emitting pointing element 70 using the template matching, the feature extraction process, the edge detection process, or the like.

Modified Example 11

Although in the above description of the embodiments, there is described the configuration in which the interactive projector 100 is provided with the detection light irradiation section 410, it is also possible to adopt a configuration in which the interactive projector 100 is not provided with the detection light irradiation section 410. In the case in which the interactive projector 100 is not provided with the detection light irradiation section 410, it is also possible for the support member 910 to be provided with the configuration of irradiating the entire area including the screen surface SS and the space in front of the screen surface SS with the irradiating detection light for detecting the tip of the non-light-emitting pointing element 80. It should be noted that in the case of the configuration in which the interactive projector is provided with the detection light irradiation section as in the case of the embodiments described above, the projector can easily control the irradiation timing with the detection light in association with the imaging timing with the cameras, which is preferable. Further, in the case in which the interactive projector 100 is not provided with the detection light irradiation section 410, it is also possible to provide both of the two cameras 310, 320 with a configuration having an imaging function of receiving and imaging the light including visible light, and to provide a configuration of detecting the tip of the non-light-emitting pointing element 80 based on the taken image obtained by receiving and then imaging the light including the visible light. It should be noted that in the case of the configuration in which the interactive projector is provided with the detection light irradiation section as in the case of the embodiments described above, the non-light-emitting pointing element can easily and accurately be detected compared to the configuration of detecting the non-light-emitting pointing element based on the taken image obtained by receiving and imaging the light including the visible light.

Modified Example 12

Although in the above description of the embodiments, there is described the so-called ultra short focus projector as the interactive projector 100, the invention is not limited to this example. Specifically, it is also possible for the projection image PP of the memory image MP to be formed to have an inverted trapezoidal shape due to the keystone distortion correction. Also in this case, the projected screen PS has the rectangular shape shown in FIG. 6, and the projected screen area PSR of the taken image $M_0$ has the rectangular shape shown in FIG. 6. As the local magnification, it is possible to use the magnification of the area corresponding to the projected screen area PSR of the taken image $M_0$ with respect to each of the local areas of the projection image PP of the memory image MP similarly to the embodiments described above.

Although the embodiments of the invention are hereinabove explained based on some specific examples, the embodiments of the invention described above are only for making it easy to understand the invention, but not for limiting the scope of the invention. It is obvious that the invention can be modified or improved without departing from the scope of the invention and the appended claims, and that the invention includes the equivalents thereof.

What is claimed is:

1. A method of controlling an interactive projector capable of receiving an instruction of a user with respect to a projected screen with a pointing element, the method comprising:
    projecting the projected screen on a screen surface;
    taking an image of an area of the projected screen including the pointing element;
    storing the projected screen in a storage device;
    performing a detection process for detecting the pointing element based on the taken image including the pointing element;
    sectioning the taken image including the pointing element into a plurality of small areas to perform the detection process for detecting the pointing element in at least one of the small areas using a parameter different from parameters in the rest of the small areas; and deriving a deformation ratio of the projected screen included in the taken image to the projected screen stored in the storage device for each of the small areas to determine the parameter for the detection process based on the deformation ratio.

2. A method of controlling an interactive projector capable of receiving an instruction of a user with respect to a projected screen with a pointing element, the method comprising:

projecting the projected screen on a screen surface;

taking an image of an area of the projected screen including the pointing element;

storing the projected screen in a storage device;

performing a detection process for detecting the pointing element based on the taken image including the pointing element; and sectioning the taken image including the pointing element into a plurality of small areas to perform the detection process for detecting the pointing element in at least one of the small areas using a parameter different from parameters in the rest of the small areas, wherein the small areas are sectioned based on a deformation ratio of the projected screen included in the taken image to the projected screen stored in the storage device.

* * * * *